(12) United States Patent
Damy

(10) Patent No.: US 10,706,457 B2
(45) Date of Patent: Jul. 7, 2020

(54) METHOD, SYSTEM, AND MEDIUM FOR VIRTUAL WALL ART

(71) Applicant: Julian Damy, Brooklyn, NY (US)

(72) Inventor: Julian Damy, Brooklyn, NY (US)

(73) Assignee: FUJIFILM NORTH AMERICA CORPORATION, Valhalla, NY (US)

( * ) Notice: Subject to any disclaimer, the term of this patent is extended or adjusted under 35 U.S.C. 154(b) by 513 days.

(21) Appl. No.: 15/061,927

(22) Filed: Mar. 4, 2016

(65) Prior Publication Data

US 2017/0132694 A1 May 11, 2017

Related U.S. Application Data

(60) Provisional application No. 62/252,369, filed on Nov. 6, 2015.

(51) Int. Cl.

| G06Q 30/06 | (2012.01) |
| G06F 3/0484 | (2013.01) |
| G06T 11/80 | (2006.01) |
| G06T 11/60 | (2006.01) |
| G06F 3/0488 | (2013.01) |
| G06Q 50/00 | (2012.01) |

(52) U.S. Cl.
CPC ....... *G06Q 30/0643* (2013.01); *G06F 3/0488* (2013.01); *G06F 3/04842* (2013.01); *G06F 3/04845* (2013.01); *G06F 3/04847* (2013.01); *G06Q 30/0621* (2013.01); *G06T 11/60* (2013.01); *G06T 11/80* (2013.01); *G06Q 50/01* (2013.01); *G06T 2207/20212* (2013.01); *G06T 2215/16* (2013.01)

(58) Field of Classification Search
CPC .................................................. G06Q 30/0643
See application file for complete search history.

(56) References Cited

U.S. PATENT DOCUMENTS

| 5,601,431 A | 2/1997 | Howard |
| 6,215,502 B1 | 4/2001 | Ferguson |

(Continued)

OTHER PUBLICATIONS

Lu, "Methods for Augmented Reality E-Commerce," 2007, pp. 3-7, 10-30 (Year: 2007).*

(Continued)

*Primary Examiner* — Brittney N Miller
*Assistant Examiner* — Anna Mae Mitros
(74) *Attorney, Agent, or Firm* — Womble Bond Dickinson (US) LLP

(57) ABSTRACT

Custom creation of wall decor using a device configured to display an interactive wall art environment. The interactive wall art environment incorporates a user photo of a furnished room, including a background wall and a scaled image of the furniture in the room, and a curated layout of items displayed in proportion to the scaled image of the furniture to simulate the appearance of the wall art in the furnished room. The user can alter the wall art environment as desired, including selecting a custom wall color and a predefined image of furniture to simulate a furnished room instead of using the photo of the furnished room. The display of the interactive wall art environment includes displaying the cost of purchasing the customized items in the curated layout and linking to a shopping interface for transacting the purchase.

21 Claims, 33 Drawing Sheets

(56) References Cited

U.S. PATENT DOCUMENTS

| | | |
|---|---|---|
| 6,618,955 B2 | 9/2003 | Rice |
| 6,880,259 B1 | 4/2005 | Schultz |
| 7,092,966 B2 | 8/2006 | McIntyre |
| 7,277,572 B2 | 10/2007 | MacInnes et al. |
| 7,421,796 B1 | 9/2008 | Deangelis-Morris |
| 7,533,129 B2 | 5/2009 | McIntyre |
| 8,253,731 B2 | 8/2012 | Hoguet |
| 8,319,788 B2 | 11/2012 | Buzyn et al. |
| 8,806,332 B2 | 8/2014 | Cok |
| 8,913,301 B2 | 12/2014 | Chinnici et al. |
| 8,989,440 B2 | 3/2015 | Klusza et al. |
| 9,019,297 B2 | 4/2015 | Buzyn et al. |
| 9,179,102 B2 | 11/2015 | Ptucha et al. |
| 9,355,470 B2 | 5/2016 | Merrell et al. |
| 9,965,800 B1 * | 5/2018 | Pitstick .............. G06Q 30/0643 |
| 2001/0034668 A1 * | 10/2001 | Whitworth ............ G06Q 30/06 705/26.3 |
| 2001/0047250 A1 | 11/2001 | Schuller et al. |
| 2002/0124426 A1 | 9/2002 | Dewberry |
| 2003/0051255 A1 | 3/2003 | Bulman et al. |
| 2006/0080901 A1 | 4/2006 | Wagner et al. |
| 2006/0195792 A1 | 8/2006 | Burnett et al. |
| 2007/0143082 A1 | 6/2007 | Degnan |
| 2010/0141552 A1 | 6/2010 | Ferlitsch et al. |
| 2011/0029914 A1 | 2/2011 | Whitby et al. |
| 2011/0157227 A1 | 6/2011 | Ptucha et al. |
| 2012/0166299 A1 | 6/2012 | Heinstein et al. |
| 2013/0073420 A1 | 3/2013 | Kumm et al. |
| 2013/0093782 A1 | 4/2013 | Wakefield et al. |
| 2013/0201210 A1 * | 8/2013 | Vaddadi ................ G06T 19/006 345/632 |
| 2014/0082491 A1 * | 3/2014 | Adachi ................. G06F 3/0488 715/702 |
| 2014/0096404 A1 | 4/2014 | Chen |
| 2014/0132633 A1 * | 5/2014 | Fekete ................... G06T 11/60 345/634 |
| 2014/0259718 A1 | 9/2014 | Mehra et al. |
| 2014/0298209 A1 | 10/2014 | Gil et al. |
| 2015/0146169 A1 * | 5/2015 | Ye ........................ A61B 3/0083 351/204 |
| 2015/0177960 A1 | 6/2015 | Topakas et al. |
| 2016/0040971 A1 * | 2/2016 | Hoge ................... G01B 3/1084 33/701 |
| 2016/0179315 A1 | 6/2016 | Sarao et al. |

OTHER PUBLICATIONS

PCT/US2017/049621 Notification of Transmittal of International Search Report and Written Opinion dated Nov. 8, 2017, 8 pages.

Sutterfly, "Design a Wall Arrangements", https://cdn.staticsfly.com/i/daw/shutterfly_design-a-wall_arrangements.pdf, accessed Apr. 26, 2016.

International Preliminary Report on Patentability received for PCT Patent Application No. PCT/US2017/049621, dated Mar. 14, 2019, 7 pages.

T. Germer and M. Schwarz, Computer Graphics Forum, vol. 28 (2009), No. 8, pp. 2068-2078 (Year: 2009).

Shutterfly. "Design-a-WAll", https://www.shutterfly.com/design-a-wall/, accessed on Apr. 26, 2016.

* cited by examiner

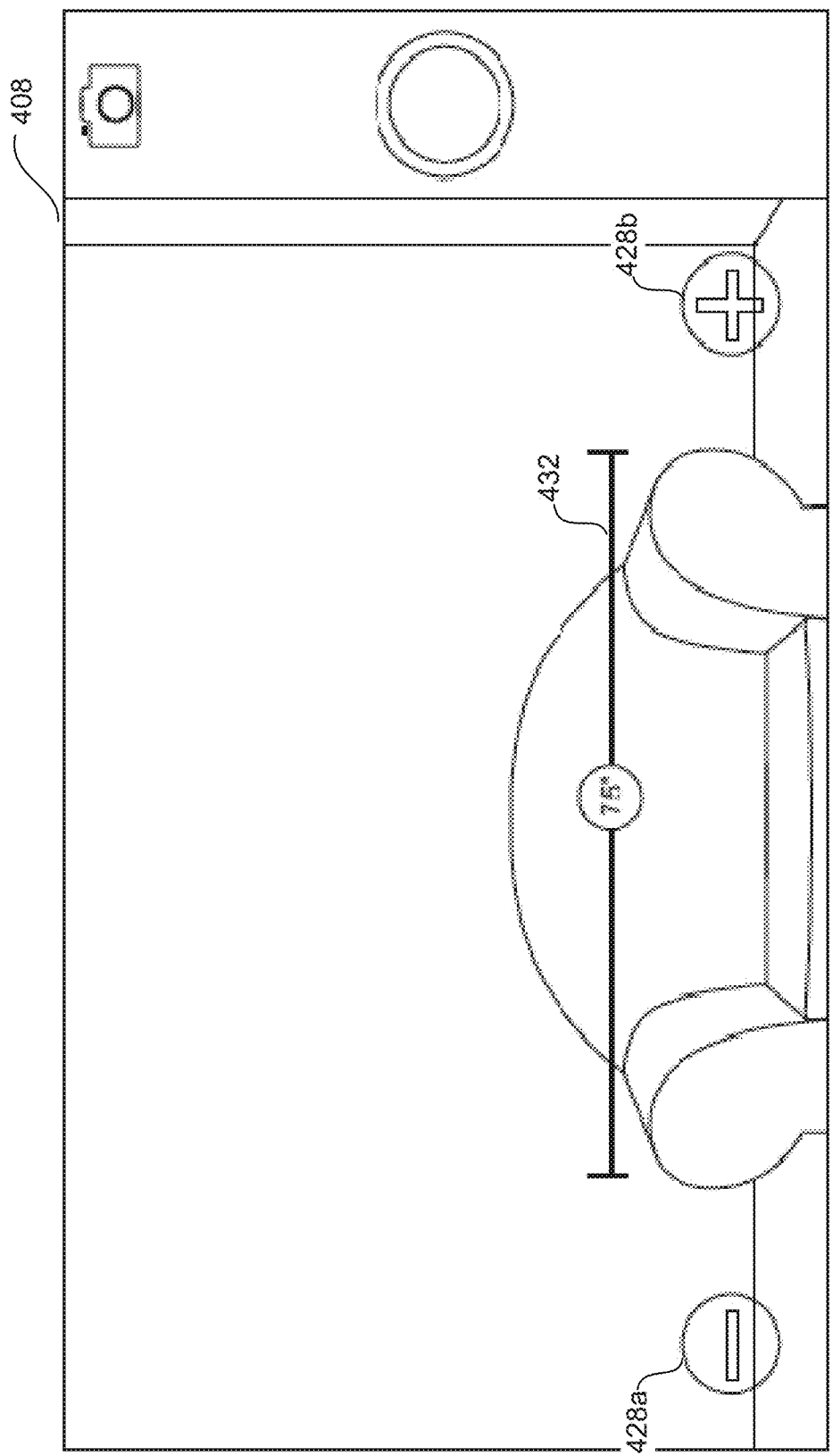

METHOD, SYSTEM, AND MEDIUM FOR VIRTUAL WALL ART

CROSS-REFERENCE

This application claims the benefit of the earlier filing date of provisional Application Ser. No. 62/252,369, filed on Nov. 6, 2015 entitled Wall Art System.

TECHNICAL FIELD

The technical field is generally related to computer systems, and in particular computer systems that facilitate consumer selection and purchase of art and photographic prints.

BACKGROUND

Today there are numerous internet-based services for purchasing art and photographic prints, such as ordering from art gallery websites, consumer photo websites and in-store consumer photo kiosks. These services take advantage of the ability to browse, select and customize digital photographs or images of paintings and other visual art in preparation for generating an order for a print, poster, framed art and the like.

As with any consumer product, however, it can be difficult for the consumer to know whether the product is the proper size, color or style and the like to complement their home's decor. Consumers invest valuable time and money in making a purchase of a custom framed photo or other art that is typically not refundable should the purchase be less than satisfactory.

SUMMARY

Methods, systems, apparatus, and machine-readable media facilitate the selection and purchase of wall art. In a user device, a wall art system generates and displays on the device's interactive display interface a wall art environment composed of a background and foreground, the background an image of a wall, the foreground an image of furniture, the wall art system operable to determine a scale of the wall art environment based on a measurement of the furniture, display a curated layout of one or more items of wall art in proportion to the determined scale of the displayed wall art environment and positioned on the interactive display interface to appear as if hung on the wall above the furniture, and to facilitate a purchase of physical instantiations of the one or more items of wall art, including the entire curated layout.

In one embodiment, the system prompts the user to take a photo of a furnished room to use for the wall and furniture forming the respective background and foreground of the wall art environment. In one embodiment, the system activates a camera feature on the user's device and prompts the user to enter a measurement of the actual size of the furniture in the furnished room before taking the photo. In response to the entered measurement, the system displays a measurement interface, including a guideline superimposed on the camera viewer in which the guideline is adjusted to reflect the entered measurement and scaled to the size of the image captured with the camera. In one embodiment, the displayed measurement guideline helps the user to compose the photo with the furniture positioned within the measurement guideline.

In one embodiment, the entered measurement is a measurement of a width of the furniture along a horizontal plane. The wall art system uses the measurement of the furniture to determine the scale of the measurement guideline and the wall art environment, where the scale is determined based on a ratio of the measurement of the actual size of the furniture to the image size of the furniture.

In one embodiment, the system uses the determined scale of the wall art environment to display one or more items containing the wall art and/or the entire curated layout so that they appear in proportion to the determined scale of the wall art environment. In this manner the display of the curated layout of one or more items simulates the actual dimensions and appearance of the wall art relative to the measured width of the furniture when viewed with the user's device.

In one embodiment, instead of using a photo for the wall art environment, the system prompts the user to select a color for the wall in the background of the wall art environment, and further prompts the user to select a room type from a variety of predefined room types containing stored images of furniture for the foreground of the wall art environment, e.g. bed, couch, dining table, and the like. Rather than a user-entered measurement of the furniture, a predefined width associated with furniture in a stored image contained in the selected predefined room type is used to display any one or more items containing the wall art and/or the entire curated layout so that they appear in proportion to the determined scale of the wall art environment.

In one embodiment, the system prompts the user to select a curated layout of items from any one or more curated layouts of a collage of items pre-arranged to fit within an area on the wall in proportion to the determined scale of the wall art environment. Upon selection, the system positions the curated layout in the background of the wall art environment on the wall at a suitable location above the topmost edge of the furniture in the foreground so that the display of the curated layout of items simulates the appearance of being hung on the wall above the furniture in the user's furnished room or the predefined room type depending on which way the user decided to generate the wall art environment on their device.

In one embodiment, once the wall art environment and curated layout selection is complete, the system prompts the user to select and customize wall art in the context of the wall art environment. For example, each item in the curated layout of items is user-selectable. Once selected, the system prompts the user to customize the selected item with one of the user's own photos or with another art selection, such as from an online art catalog, until any one or more of the items in the entire curated layout of items have been selected and customized to the user's satisfaction.

In one embodiment, the system prompts the user to further customize the photos or other art for a selected item, including causing the device to display an interface to crop and/or rotate the photo or art within the boundaries of the selected item and, optionally, to add a filter to change the appearance of the item.

In one embodiment, the system prompts the user to further customize a selected item, including causing the device to display an interface to style the production of the item with a variety of options, including whether to frame, mat and/or double mat the item, or use paper, canvas, wood and/or metal in the print production of the item. In one embodiment, as the user's customizations change, the system dynamically changes the appearance on the user device display of the selected item to reflect the current customization.

In one embodiment, at any point during customizing the items, the system is operable to display a ruler graphic that, when activated, superimposes a ruler graphic over the selected item to illustrate one or more dimensions of the item relative to the width of the furniture used to scale the wall art environment. In one embodiment, the system can also activate the ruler graphic for the entire curated layout, and not just a single item in the layout, to display one or more dimensions of each item as well as one or more dimensions of the entire curated layout relative to the width of the room furniture, including relative to the user-entered measured width of the furniture in the furnished room or the predefined width associated with the furniture in the image contained in the predefined room type depending on which way the user opted to generate the wall art environment on their device.

In one embodiment, the system saves the customized wall art and wall art environment in the user's device as a curated wall for future use. In one embodiment, the system prompts the user to activate their device's communication capabilities, such as messaging, email, and/or social media apps, to optionally share the stored curated wall with other users.

In one embodiment, the system causes the device to display an order graphic simultaneously with the display of the user's curated wall. In one embodiment the order graphic is a shopping interface that displays the current number of items in the curated layout and a total purchase price for the items in the curated layout as customized and in the user's curated wall. In one embodiment, the purchase price is dynamically updated as the items are customized to allow the user to track the total cost of purchasing any one or more the items in the curated layout as customized in the user's curated wall. In one embodiment, in response to a user selection of an item, the shopping interface adjusts the display of the order graphic to display an individual purchase price for the selected item instead of or in addition to the total purchase price for all of the customized items in the curated wall.

In one embodiment, in response to a user selection, the system activates a shopping interface associated with the order graphic causing the device to facilitate the purchase of one or more physical instantiations of the customized items from a merchant system in communication with the user's device.

Corresponding methods, systems, apparatus, and machine-readable media for interfacing with the user device can be implemented in servers supporting the user device and the functions of the wall art system.

BRIEF DESCRIPTION OF THE DRAWINGS

The present invention is illustrated by way of example and not limitation in the figures of the accompanying drawings, in which like references indicate similar elements and in which:

FIGS. 4a-4g, FIGS. 5a-5f, FIGS. 6a-6h, FIGS. 7a-7b, FIGS. 8a-8b, FIG. 9, and FIGS. 10a-10b, illustrate examples of a user device client graphical user interface (GUI) implemented on a display device as described in accordance with embodiments of the invention as follows:

FIGS. 4a-4g illustrate several views of the GUI for generating the wall art environment that serves as the context within which the user is guided to select and customize wall art.

FIGS. 5a-5f illustrate several views of the GUI for selecting and displaying the curated layout of one or more items in the wall art environment.

FIGS. 6a-6h illustrate the several views of the GUI for selecting and customizing an item in the curated layout.

FIGS. 7a-7b illustrate two views of the GUI for cropping and rotating the contents of an item in the curated layout.

FIGS. 8a-8b illustrate the GUI for selecting the user's own photos for an item in the curated layout.

FIG. 9 illustrates the GUI for general menu options, including options for sharing a curated wall with another user.

FIGS. 10a-10b illustrate the GUI for purchasing one or more items as customized in the curated wall.

DETAILED DESCRIPTION

Figure 1:
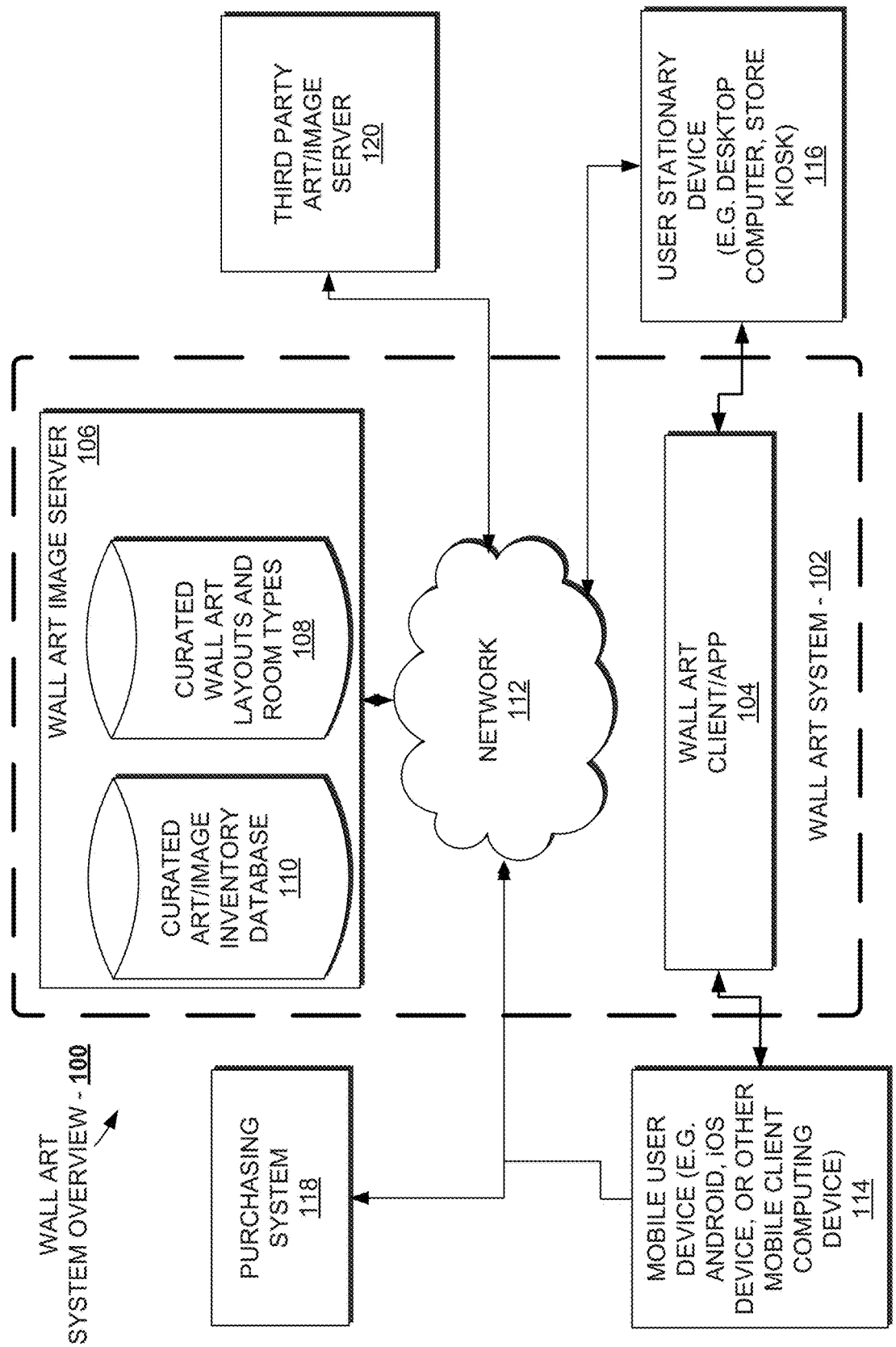
FIG. 1 illustrates an overview of an embodiment of a wall art system in an operating environment.

In keeping with the foregoing observations, a novel wall art system is described in which a client operates in conjunction with a server or servers interfacing with the client to facilitate user selection, purchase of art suitable for hanging on a wall using a wall art environment generated and displayed in the client's graphical user interface (GUI). The art includes any photographic or other visual images for which a physical instantiation can be produced, such as a framed photograph or artwork, and is referred to herein as "wall art."

In one embodiment the wall art environment generated in the GUI comprises a photo of a furnished room, wherein the user is prompted to take the photo of the furnished room with the user device in a manner that allows a measurement of a size of the furniture in the room to be used to ensure that the furniture is properly positioned in the photo to the scale of the wall art environment for use with the visual representation of the curated layout of items of wall art.

In an alternative embodiment, the wall art environment generated in the GUI comprises an image of a wall and furniture based on one of a variety of predefined room types in which a predefined measurement of the size of the furniture in the predefined room type is used to scale the wall art environment for use with the visual representation of the curated layout of items of wall art. In one embodiment, the user device prompts the user to select the color of the wall and/or the room type.

Whether the wall art environment comprises the wall and furniture from user's photo of the furnished room or from one of the predefined room types, in one embodiment, the user is prompted to select, purchase and/or customize the curated layout of items in the context of the wall art environment.

In one embodiment, the curated layout of items of art or images is positioned on the wall above the top edge of the furniture to simulate the actual dimensions and appearance of wall art relative to the scaled wall art environment. For example, the items containing the wall art and the overall size of the curated layout is displayed in proportion to the scale of the of the wall art environment so that the curated layout of items simulates the actual dimensions and appearance of wall art relative to the actual size of the furniture as depicted in the scaled wall art environment.

In one embodiment, the novel wall art system allows the user to share their selection and customization of wall art in the context of the wall art environment, including saving the curated layout and wall art environment in a user-curated wall stored on the user device. The stored user-curated wall can be used to share the user's selection and customization of wall art with others, and to re-generate the curated layout and wall art environment on a user device when desired.

The client may be implemented on a variety of platforms for user devices, such as a mobile application on a mobile device using a mobile operating system such as the iOS or Android operating systems, or on a browser-based application on a stationary or mobile device using a Microsoft Windows or MAC OS/X operating system. The one or more wall art servers and databases may be implemented on a variety of server platforms, and in particular implemented in a cloud-based storage platform to facilitate access by the client.

In one embodiment, the client is configured to receive the curated layouts of the wall art environment. The curated layouts are typically predefined in the wall art system to appeal to a wide number of users. For example, in one embodiment, the curated layouts contain a collage of one to eight or more items, each item bounded by four sides in the shape of a square or rectangle. The curated layouts are predefined to accommodate different configurations of photos or art in a pleasing arrangement that appeals to most users. In one embodiment the predefined curated layouts are static, but may be updated from time to time to reflect user demand. In one embodiment, other shapes of items may be employed and/or the curated layouts may be dynamically updated to suit the user's preference or as dictated by the operator of the wall art system. In one embodiment, the wall art system may provide multiple versions of a curated layout for the same number of items, such as one curated layout containing 6 items arranged asymmetrically and another curated layout containing 6 items arranged symmetrically in different configurations.

In one embodiment, the client is configured to receive a variety of predefined room types to use for the wall art environment. The room types are typically predefined in the wall art system to contain images of colored walls and different types of furniture for users to visualize wall art in juxtaposition with the furniture in a room. The room types include the types of rooms that are commonly found in a home or office, such as a bedroom, a living room, conference room and the like. In one embodiment, the furniture contained in the images includes furniture such as a couch for a living room, a table and chairs for a dining room, and the like. The image of a room type typically depicts a two-dimensional front view of the furniture projected to the view plane and the image of the furniture typically is positioned to appear in the lower half of the wall art environment GUI to allow room for a curated layout. The curated layout can be positioned on the wall at a suitable distance above the topmost edge of the front view of the furniture in the room type image, such as above the top edge of the couch.

In one embodiment, the predefined room types are static, but may be updated from time to time to reflect updated styles or particular types of furniture, or in response to user demand. In one embodiment, other room type images may be employed and/or the room types may be dynamically updated to suit the user's preference or as dictated by the operator of the wall art system.

In one embodiment, the client is configured to receive and/or generate the wall colors of the wall that serves as the background layer of the wall art environment. In a typical embodiment, the color of the wall may be customized to suit the user's preferences using a color selector interface, including a color picker tool that allows the user to select any color within the range of color values that can be displayed on their device.

In one embodiment, the interactive GUI is typically displayed on the user's mobile device client. In addition, or alternatively, an interactive GUI can be displayed to the user on a different device, such as a laptop, PC, or other stationary device, including a consumer photo kiosk operating in a merchant store. The interactive GUI can take different forms depending on the user device operating system platform on which it is activated, ranging from applications operating on mobile device platforms to web-based browser applications.

In one embodiment, a user can select not only photos from their own device, but also photos stored in social media accounts to which their device has access. In one embodiment, a user can select art from a curated art/image inventory database curated on behalf of all users and hosted by the operator of the wall art system. Alternatively, the user can select art from a third party art/image server in cooperation with the wall art system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below.

The processes or methods depicted in the figures described herein may be performed by processing logic that comprises hardware (e.g. circuitry, dedicated logic, etc.), software (e.g., embodied on a non-transitory computer readable medium), or a combination of both. Although the processes or methods are described in terms of some sequential operations, it should be appreciated that some of the operations described may be performed in a different order. Moreover, some operations may be performed in parallel rather than sequentially.

In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; non-transitory media, etc.

FIG. 1 illustrates of an overview 100 of an exemplary wall art system 102 in an operating environment in accordance with embodiments of the invention. The system 102 includes, among others, components to support the operation of a wall art client/app 104 operating on any of mobile user device 114 or user stationary device 116 in conjunction with a wall art image server 106. The server 106 communicates with the client 104 over a network 112. The wall art system 102 further interoperates with a purchasing system 118 and third party art/image, i.e. wall art, server 120 to facilitate the selection and purchase of wall art products by a user. The content of the server 106 and client 104 is accessible remotely over the network 112 by authorized users.

In a typical environment, the client 104 is implemented as an application running on a mobile user device 114 or any other type of computing device having an interactive touch screen display and a mobile operating system, such as an iOS or Android operating system. The client application 104 running on the mobile user device 114 provides the user with an easy-to-use touch interactive GUI to securely access and interact with the wall art image server 106 and curated art/image inventory database 110, purchasing system 118 and/or third party art/image server 120 as needed.

In some embodiments, the client 104 can also be implemented on either a mobile or stationary user device 120 having a web-browser platform to enable the client 104 to interact with the server 106 for secure online access to content stored on the wall art image server 106, curated wall art layouts and room types 108 and curated art/image inventory database 110, purchasing system 118 and/or third party art/image server 120 in a manner similar to the application running on the mobile user device 114.

During operation, the wall art system 102 further interfaces with a variety of proprietary or non-proprietary art/image servers from which wall art images and wall art products may be obtained, such as the aforementioned third party art/image servers, or third-party merchant/purchasing system 118.

Figure 2:
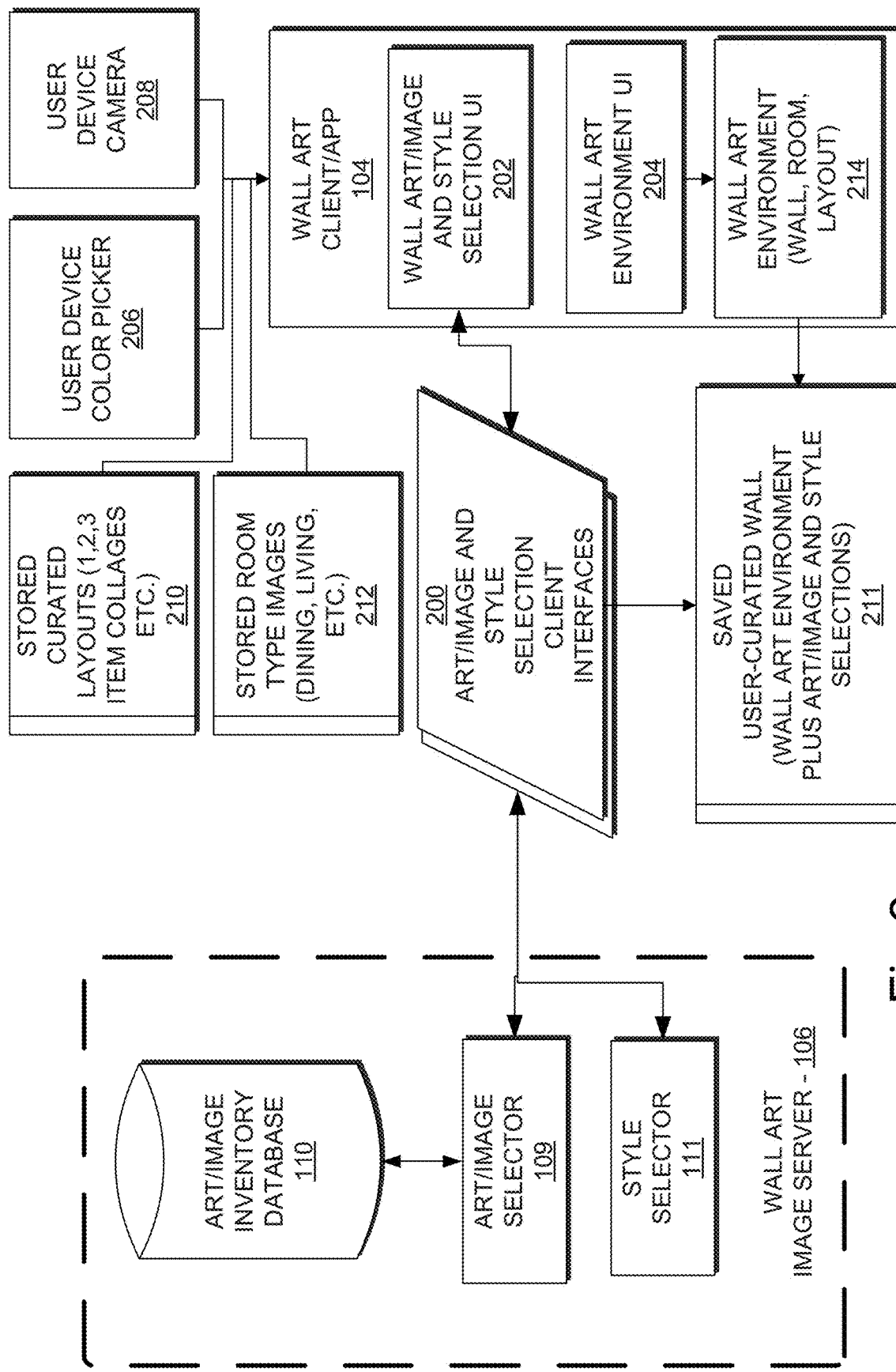
FIG. 2 illustrates an overview of the wall art system of FIG. 1 in further detail in accordance with embodiments of the invention.

FIG. 2 illustrates the exemplary wall art system of FIG. 1 in further detail in which the wall art image server 106 interfaces with the wall art client/app 104 for selecting and customizing photos and art using art/image and style selection client interfaces 200 and corresponding wall art image and style selection UI 202. The wall art image server 106 includes and art/image inventory database 110 and corresponding server components for art/image selection 109 and style selection 111.

In one embodiment, the wall art client app 104 further includes a wall art environment GUI 204 and interoperates with a user device color picker 206 and user device camera 208 and the stored curated layouts 210 and stored room type images 212 of furniture as previously received and stored on the user device from the wall art system 102, or alternatively obtained on demand from the wall art system.

In operation the wall art environment GUI 204 generates the wall art environment 214 that forms the context within which the wall art/image and style selection GUI is performed. In one embodiment, the wall art client/app 104 also saves and stores the curated wall 211 generated by the user during the selection and customization of their wall art for sharing with other users and/or for regenerating the wall art environment 214 and curated layout selections and customization for future use.

Figure 3A:
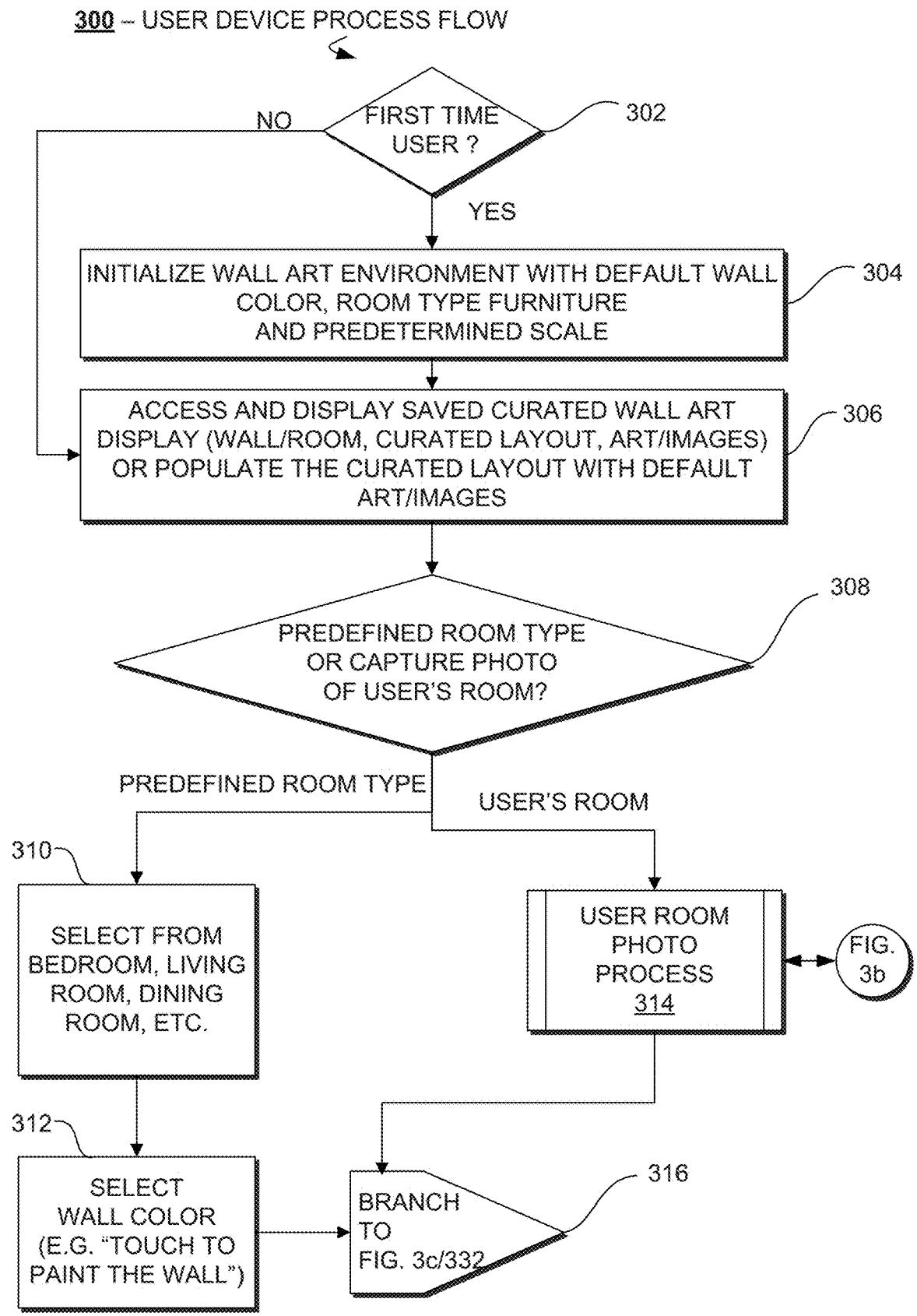
FIGS. 3a-3c are flow diagrams illustrating processes that may be utilized in a user device to operate a client in conjunction with a server in accordance with embodiments of the invention.
Figure 3B:
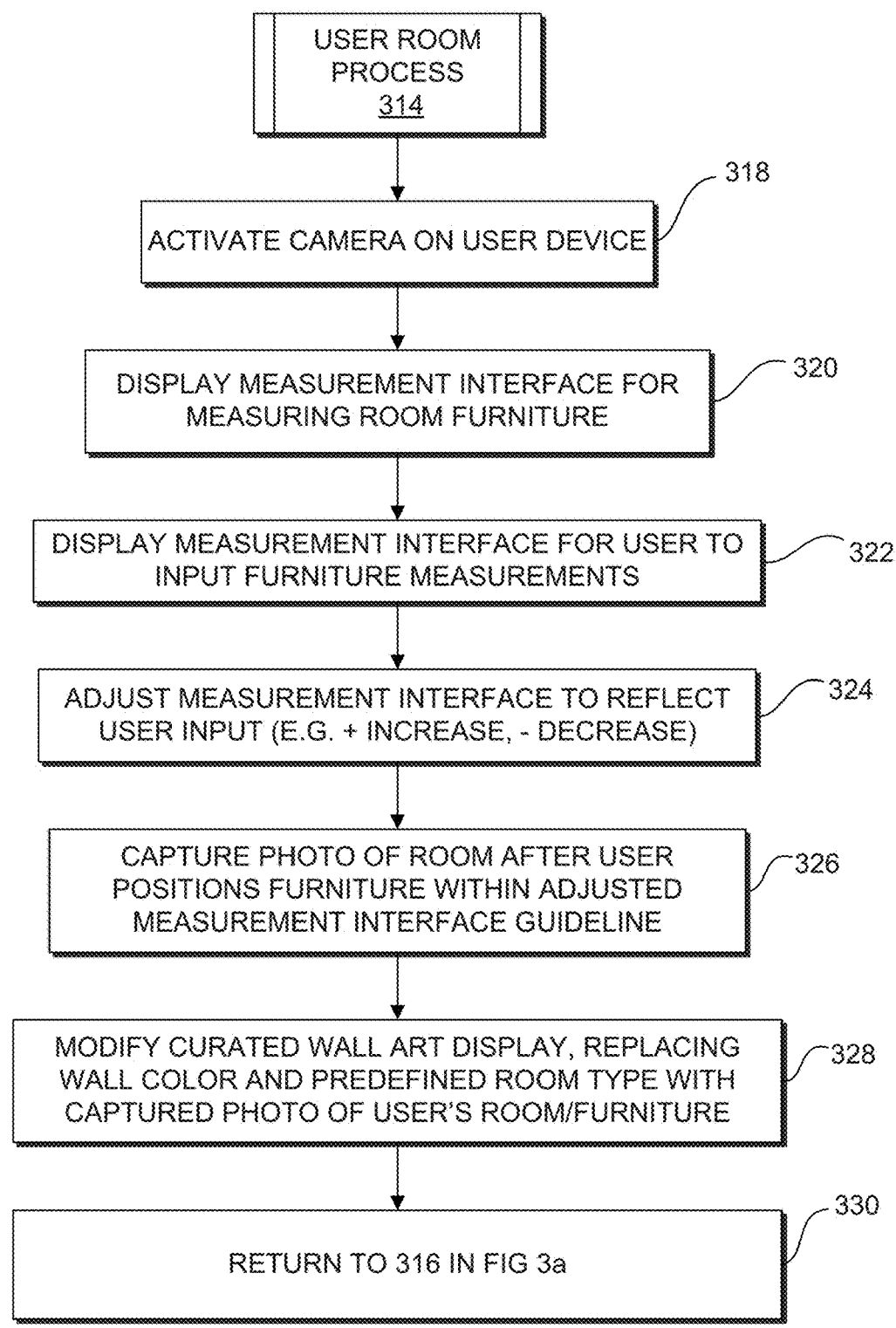
Figure 3C:
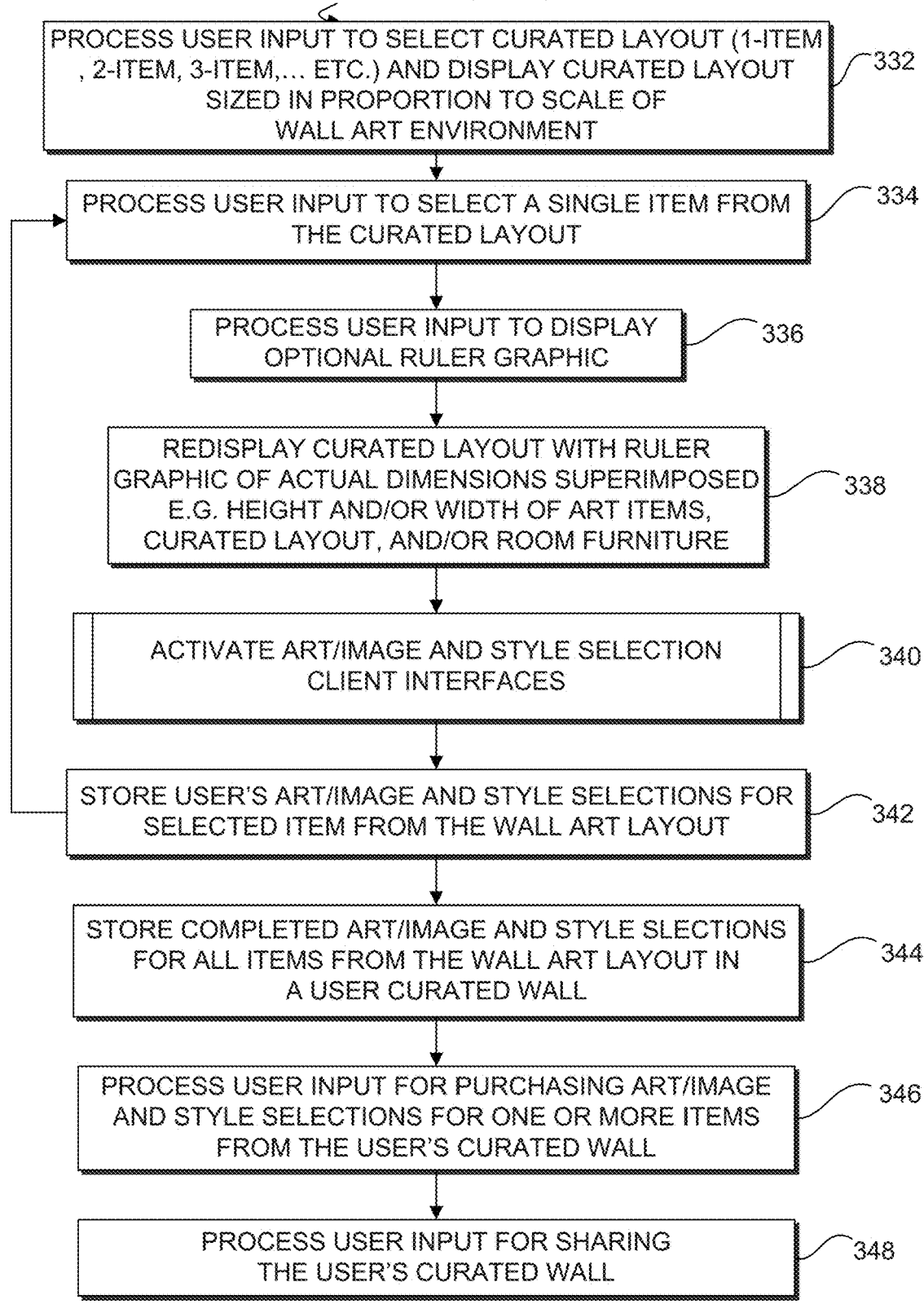

FIGS. 3a-3c are flow diagrams illustrating the processes 300 that may be utilized in a user device 114/116 to operate a client 104 in conjunction with a server 106 in accordance with embodiments the wall art system 102. The processes 300 carried out on the user device at decision block 302 to determine whether this is a first time user, and if so, a process 304 to initialize the wall art environment display with a default wall color, a default room type and a default curated layout. The default curated layout is pre-populated with default art selections in the one or more of the items comprising the default curated layout. If not a first time user, process 306 accesses and displays the previously saved curated wall from the last time the user used the wall art system, including the user's furnished room photo, if applicable, or the selected wall color and room type, and the user-customized art/images in the selected curated layout.

In one embodiment, in order to generate the wall art environment, at decision block 308, the user device processes the user input to select either a predefined room type image or to take a photo of a user's furnished room with the user device camera. At process 310, if the user selected the predefined room type image, then process user input to select the from the bedroom, living room, dining room etc., and at process 312 to select the wall color, such as by presenting the aforementioned color picker GUI to the user in response to the displayed prompt "touch to paint the wall," and branches to FIG. 3c. If the user selected the option to take a photo of a furnished room, the device initiates a series of user room processes 314 to capture the photo, described in further detail in FIG. 3b, and upon completion branches to FIG. 3c.

Regardless of which option to generate the wall art environment is chosen, the process of doing so includes a process to determine the scale of the wall art environment just generated. In a typical embodiment, the scale of the wall art environment is based on an actual size or known size of an object appearing in the environment, in this case the size of the furniture. In one embodiment, the size of the furniture is known and predefined, as in the furniture depicted in the predefined room type images. In an alternative embodiment, however, the actual size of the furniture must be measured and provided to the wall art system such as by manual entry of a measured actual size of the furniture. In a typical embodiment, the size is measured horizontally along the length of the furniture from the leftmost point to the rightmost point to measure the width of the furniture. In one embodiment, other dimensions of the furniture may be used to determine the scale of the wall art environment, such as the height of the furniture.

In a typical embodiment, the dimensions of the furniture are used in combination with camera parameters associated with the operation of the camera to properly scale the wall art environment based on the size of the furniture. In one embodiment, for example, the camera parameters include but are not limited to camera focus distance, focus mode, camera angle and image size. It should be noted that the camera parameters used to determine the scale of the wall art environment can vary based upon the type of operating system and camera of the user device and the camera features that are used to take the photo, such as whether or not the zoom feature is used to compose the photo.

In one embodiment, with reference to FIG. 3b, the user room processes 314 begins with the activation of the camera on the user device at process 318, including the display 320 of a measurement interface superimposed over the camera's interface that includes user instructional text to instruct the user to measure a size of the room's furniture, such as a width of the furniture, in preparation for taking the photo, measurement interface controls to enter the measurement, including display controls to either increase or decrease the measurements or otherwise enter the measurement of the size of the furniture, and a measurement interface guideline that is dynamically adjusted to reflect the entered measurement of the furniture. In this manner the measurement interface guideline is adjusted to reflect the scale of the photo to help the user properly position the furniture within the photo consistent with the scale of the wall art environment. In turn, subsequent processes 300 can properly display the curated layout containing the one of more items of wall art to appear in proportion to the furniture as positioned in the photo based on the scaled wall art environment.

At process 320 the device displays the measurement interface for the user to input the furniture measurements, including prompting 322 the user to increase or decrease the displayed measurement guideline until it matches the width of the user's furniture captured in the camera interface, or otherwise adjusting 324 the measurement guideline superimposed over the camera interface so that the guideline reflects the user's input.

In one embodiment, at process 326, the user is instructed to position the furniture within the adjusted measurement guideline and to take the photo. Upon capturing the image after the user takes the photo, control is transferred from the camera back to the wall art environment interface, replacing the current wall color and predefined room type image with the photo of the user's furnished room. At process 330, the wall art system scales the wall art environment resulting from taking the photo and control is returned to the wall art interface at 316 in FIG. 3a, and eventually branches to FIG. 3c to carry out the processes to select a curated layout and customize the wall art.

In FIG. 3c, in one embodiment, at process 332, the device processes the user input, if any, to select a different curated layout than what is currently displayed, e.g. selecting a 5-item collage layout instead of a 4-item collage layout.

At process 334, the device processes user input to select a single item of the curated layout positioned on the wall of the wall art environment. In one embodiment, at process 336, the device processes user input to display an optional ruler graphic superimposed over the curated layout and wall art environment, in which the optional ruler graphic is scaled in accordance with the determined scale of the wall art environment. In one embodiment, in response to user input to activate the ruler graphic, at process 338 the device redisplays the curated layout with the superimposed dimensions (in ruler units of inches or centimeters, etc.) indicating the actual size of each item, the dimensions of the overall curated layout indicating the actual size of the curated layout, and the measured or predefined size of the furniture, e.g. the actual width of the furniture corresponding to the image of the furniture displayed in the current wall art environment. For example, the display of the size of the furniture in the wall art environment can include the measured width of the furniture captured in the user's furnished room or of the predefined width of the furniture displayed in the predefined room type.

At process 340, the device activates art/image/photo and style selection interfaces that will be described in further detail in the illustrations of the GUI in FIGS. 4-10. At process 342, the user device stores the art/image/photo and style selections for the selected item of the curated layout. The user selection processes repeat beginning with process 334 through 342 until all items in the curated layout have been customized to the user's selections.

In one embodiment, at process 344, the device stores the completed art/image/photo and style selections for all items in the curated layout and generates the user's curated wall. At process 346, the device processes the user input for purchasing products corresponding to the customized items (art/image/photo and style selections) in the curated layout for the stored curated wall. Lastly, at 348, the device processes user input for sharing a user's curated wall, such as sharing an image of the curated wall, and optionally including a link to purchase the customized items comprising the curated wall with other users on social media, email recipients, message recipients, and the like.

Figure 4A:

In the following paragraphs, FIGS. 4a-4g, FIGS. 5a-5f, FIGS. 6a-6g, FIGS. 7a-7b, FIGS. 8a-8b, FIG. 9, and FIGS. 10a-10b, will be described. Each of these figures illustrate examples of a user device client graphical user interface (GUI) implemented on a user display device as described in accordance with embodiments of the invention as follows:

FIGS. 4a-4g illustrate several views of the GUI for generating the wall art environment that serves as the context within which the user is guided to select and customize wall art. In FIG. 4a, for example, upon activating the GUI, the user is provided with a default wall art environment 400 including a default wall art selection 401 (e.g. a collage of 5 prepopulated items of art) and prompted 403 (optionally, in a tutorial mode of operation) to navigate the generation of a desired wall art environment by selecting a different sample room or alternative background wall color ("Swipe to select a sample room. Or tap the wall to use your own.")

In one embodiment, in addition to the navigation prompts for swiping 405a, 405b the display for selecting a sample room or modifying the background wall color 403, the user is also provided with a layout button 410 to select a different collage of items with which to decorate the wall, as well as other navigational interfaces for a ruler 412 or other interactive features 414 (such as sharing, getting help, etc.).

In one embodiment, the user is prompted to swipe right and left 405a/405b (depending on the type of device and input mechanism) until the user finds a sample room that they like.

In one embodiment, the GUI typically displays a shopping interface 416 from which the user can activate a shopping cart or other purchasing interface to purchase the items currently displayed in the wall art selection 401 on the background wall in the wall art environment 400 of the GUI.

Figure 4B:

In FIG. 4b, in one embodiment, an alternative wall art environment 402 includes a default sample room display with table and chairs and a prepopulated default curated layout containing a collage of 5 items customized with various items of art. In a tutorial mode, the user is prompted to "touch to paint the wall."

Figure 4C:
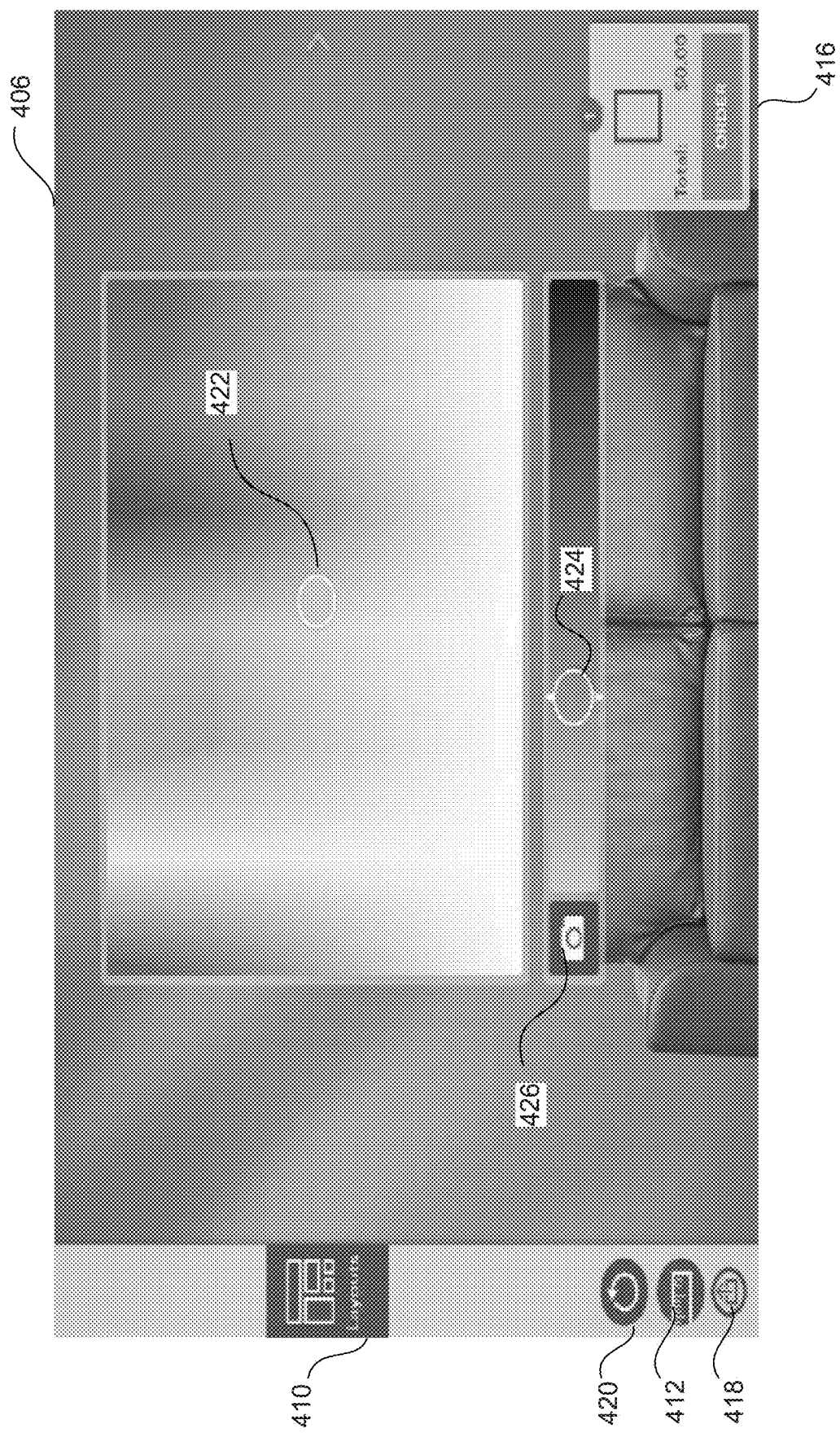

In a typical embodiment, touching any part of the wall in this wall environment 402, or any wall art environment, including the previous example wall art environment 400, activates the GUI in FIG. 4c, illustrating a color picker interface 422/424 for the user to select a new color for the wall. As an alternative selection, the user can click/touch the camera icon 426 to trigger the camera interface GUI illustrated in FIGS. 4d-4g.

In one embodiment, in the camera interface, the user is prompted to take a picture of a room, such as a room in their home, with a measurement interface superimposed over the camera interface to enter the measurements of the furniture captured in the picture and ensure that the scale of the photo is based on the actual size of the furniture. A properly scaled photo aids in scaling the wall art environment GUI and in the subsequent display of the one or items of wall art and the curated layout in proportion to the scaled wall art environment and actual size of the furniture. In this manner the wall art environment and curated layout of items simulates the appearance of the curated layout as it would appear when the items are hung on a wall in the user's room.

Figure 4D:
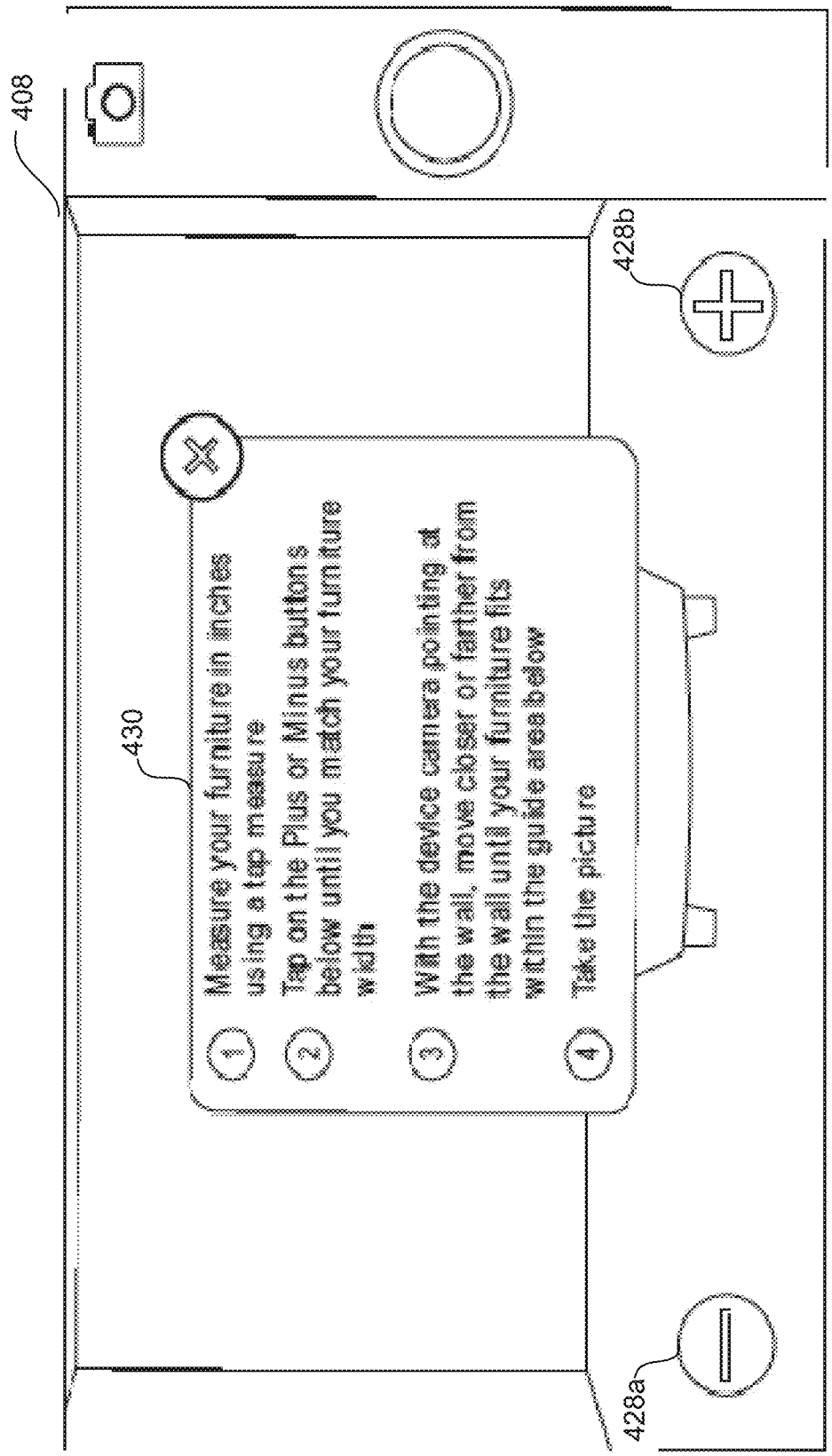

For example, with reference to FIG. 4d, in one embodiment, the camera interface 408 includes an instructional prompt 430 to the user to measure their furniture (e.g. in inches or some other metric depending on the system) and to tap on the "+" and "−" icons 428a/428b of the camera interface 408 until a measurement interface guideline is superimposed over the camera interface in a scaled length that equals the number of inches (or other unit of measurement) of the measured size (e.g. width) of the furniture.

For example, in one embodiment as illustrated in FIG. 4e, the user has measured her couch at 78 inches and has manipulated the "+" and "−" icons 428a/428b so that the measurement interface of 78 inches is displayed on the camera interface. In one example, the user might have to tap on the icons until a default measurement guideline interface of 90 inches is reduced to 78 inches to reflect the user's measurement of the width of her couch. In a typical embodiment, the activation of the "+" and "−" icons 428a/428b will remove the instructional prompt 430 (FIG. 4d); alternatively, the user can remove the instructional prompt 430 by "x" ing the prompt directly.

As illustrated in FIG. 4e, in one embodiment, the user composes the photo as instructed in the instructional prompt 430 so that their furniture is positioned within the boundaries of the 75-inch measurement interface guideline superimposed over the lower half of the camera viewer. In this manner, the furniture is properly positioned within the photograph in accordance with the scale of the wall art environment to allow sufficient wall space for displaying the curated layout in proportion to the furniture.

In one embodiment, if the user doesn't wish to use the home photo/camera interface described above in FIGS. 4c-4d, then as noted earlier the user has the option, as prompted in the GUIs 400/402 illustrated in FIGS. 4a-4b to select one of a variety of predefined room types, e.g. "swipe to find the right room."

Figure 4F:
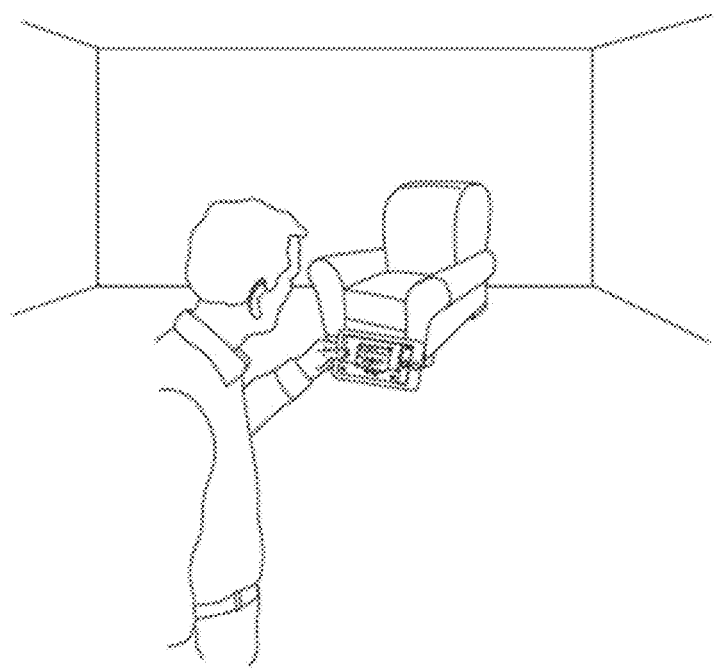
Figure 4G:
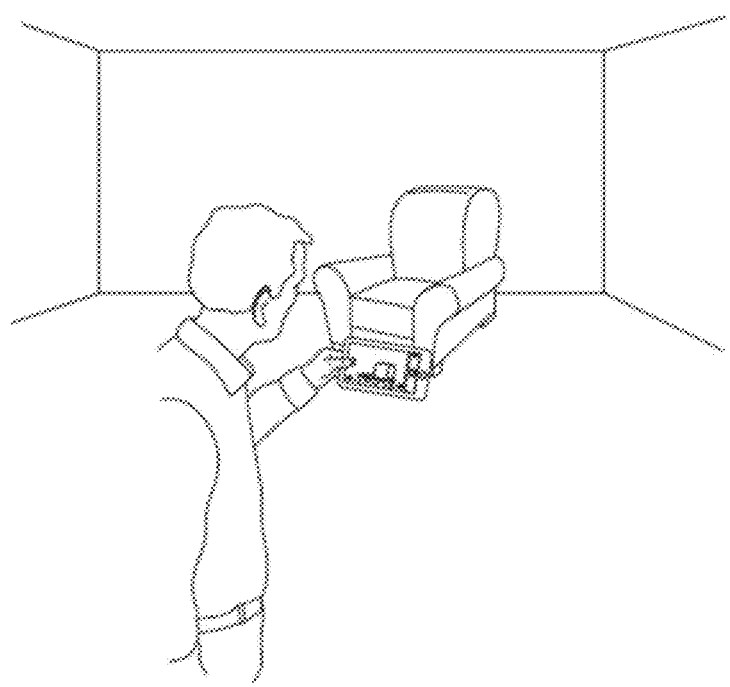

FIGS. 4f-4g, illustrate a user using their device to capture a home photo to use as their background wall environment in accordance with an embodiment of the wall art system. For example, the user in FIG. 4f views their room with their device's camera after having activated the camera interface 408 with the instructional prompt 430 on how to measure their furniture. In the illustrated embodiment, the user has entered/tapped 428a/428b the appropriate measurements, typically the measured width of the portion of the furniture that is in the foreground view of the wall art environment and above which the wall art is to be hung, such as shown in FIG. 4e. The user in FIG. 4g then proceeds to compose and take the photo of their furniture and background wall using the measurement interface guideline superimposed over the camera interface, making sure that the furniture is captured within the guideline in the lower half of the camera's image display. The photo captured with the camera then becomes the wall art environment and the user's device automatically returns to the wall art selection interface as described with reference to FIGS. 5a-5f.

Figure 5A:
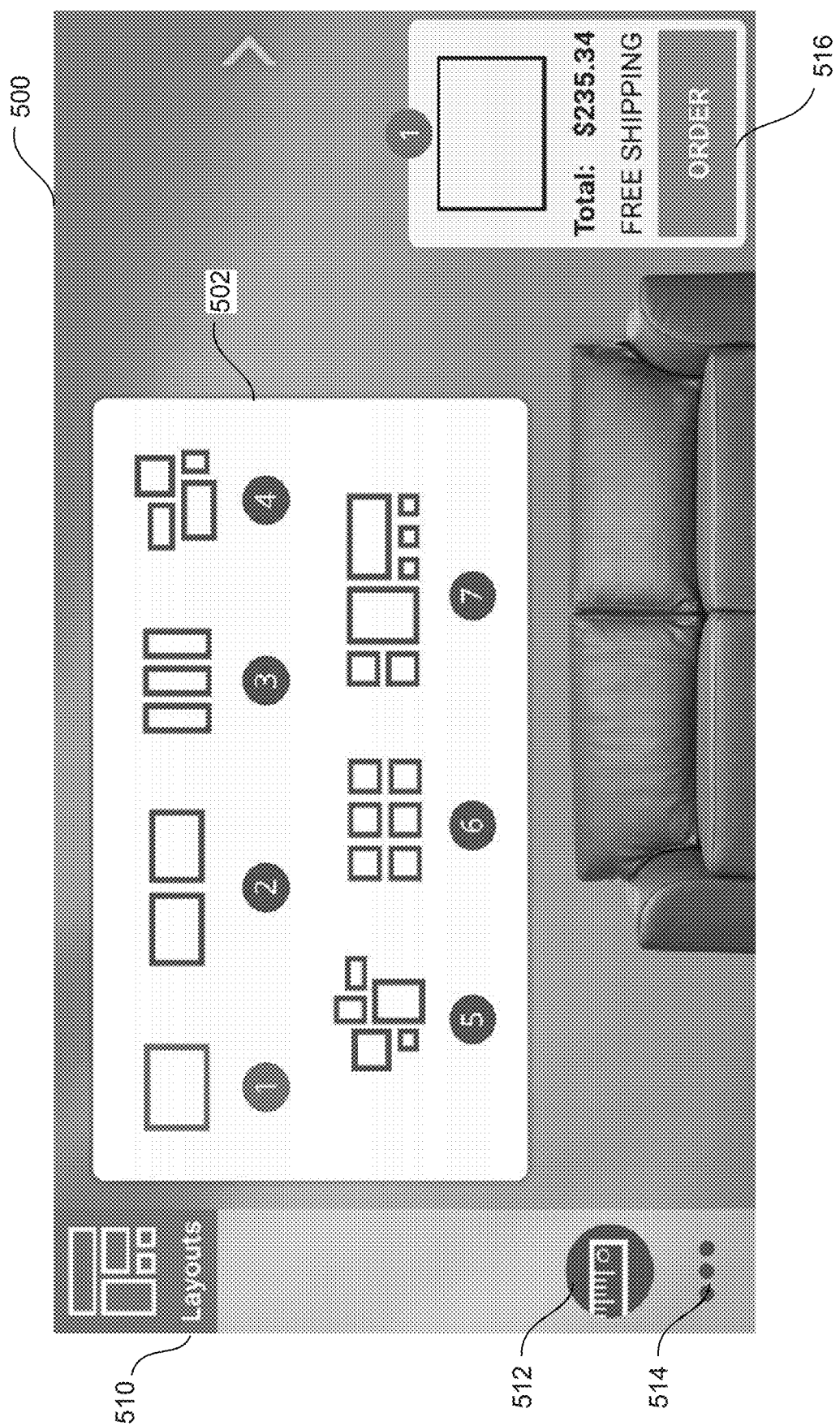
Figure 5B:
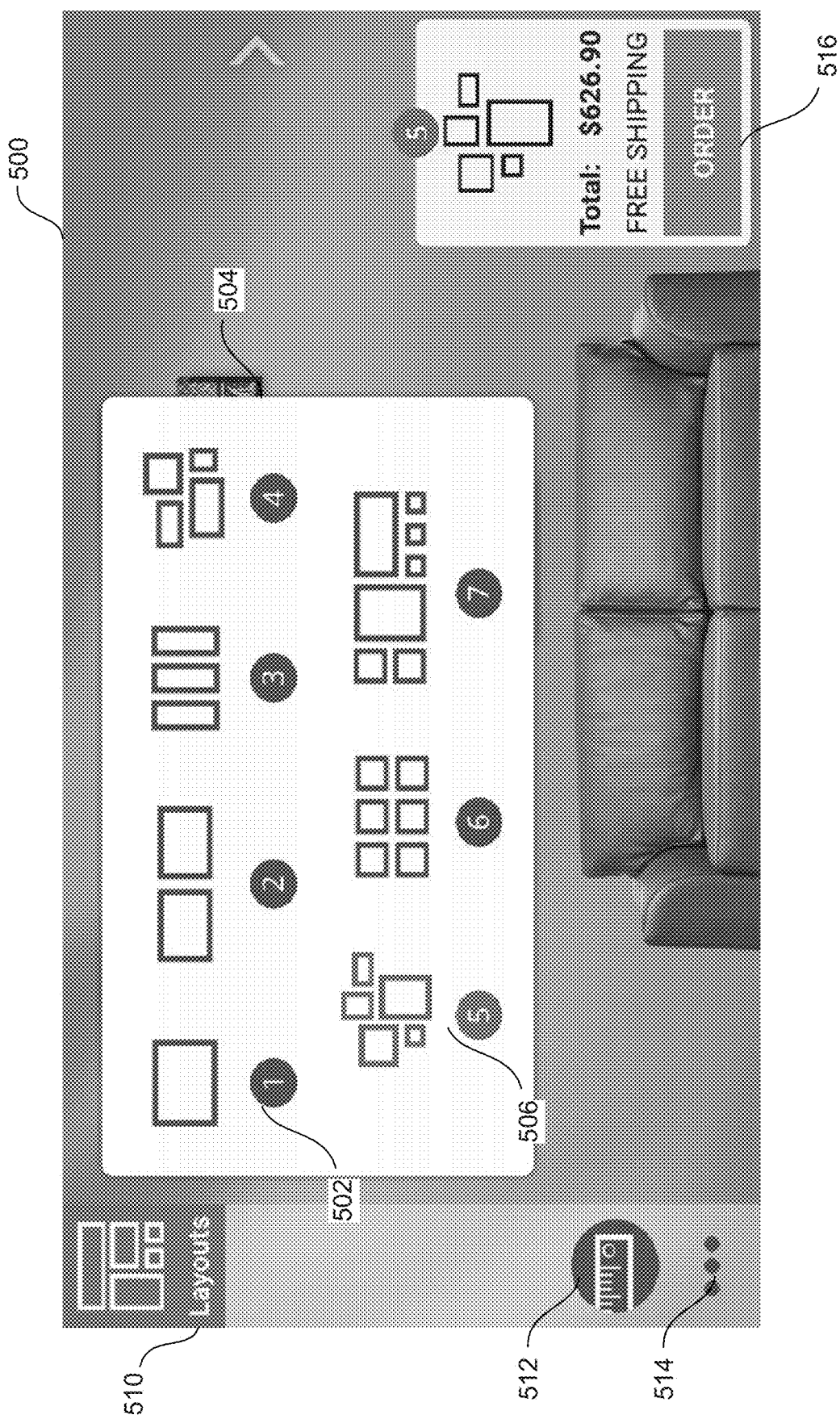

In one embodiment, once the wall art environment is complete as described above with reference to FIGS. 4a-4g, then the user is ready to select a curated layout as illustrated in FIGS. 5a-5f. For example in FIG. 5a, the user is prompted in GUI 500 with a choice of menu items 510, 512 and 514, representing a collage layout selector 510 and ruler interface 512 and an application interface 514. In one embodiment, when the collage layout selection menu item 510 is selected, the user is further prompted to select an icon from a group of icons 510 representing the arrangement of the collage of items. Thus, if a user wants a curated layout of 5 items, then he selects the icon showing 5 items, and so forth. As can be seen in FIG. 5b, as the user selects the new icon showing 5 items (instead of the default selection of a single item illustrated in FIG. 5a), the background wall of the wall art environment dynamically updates to reflect the new selection, in this case going from one item to five items as reflected in the arrangement of the collage of items displayed on the background wall (partially obscured in FIG. 5b by icon group 510) and in the shopping interface 516.

Figure 5C:
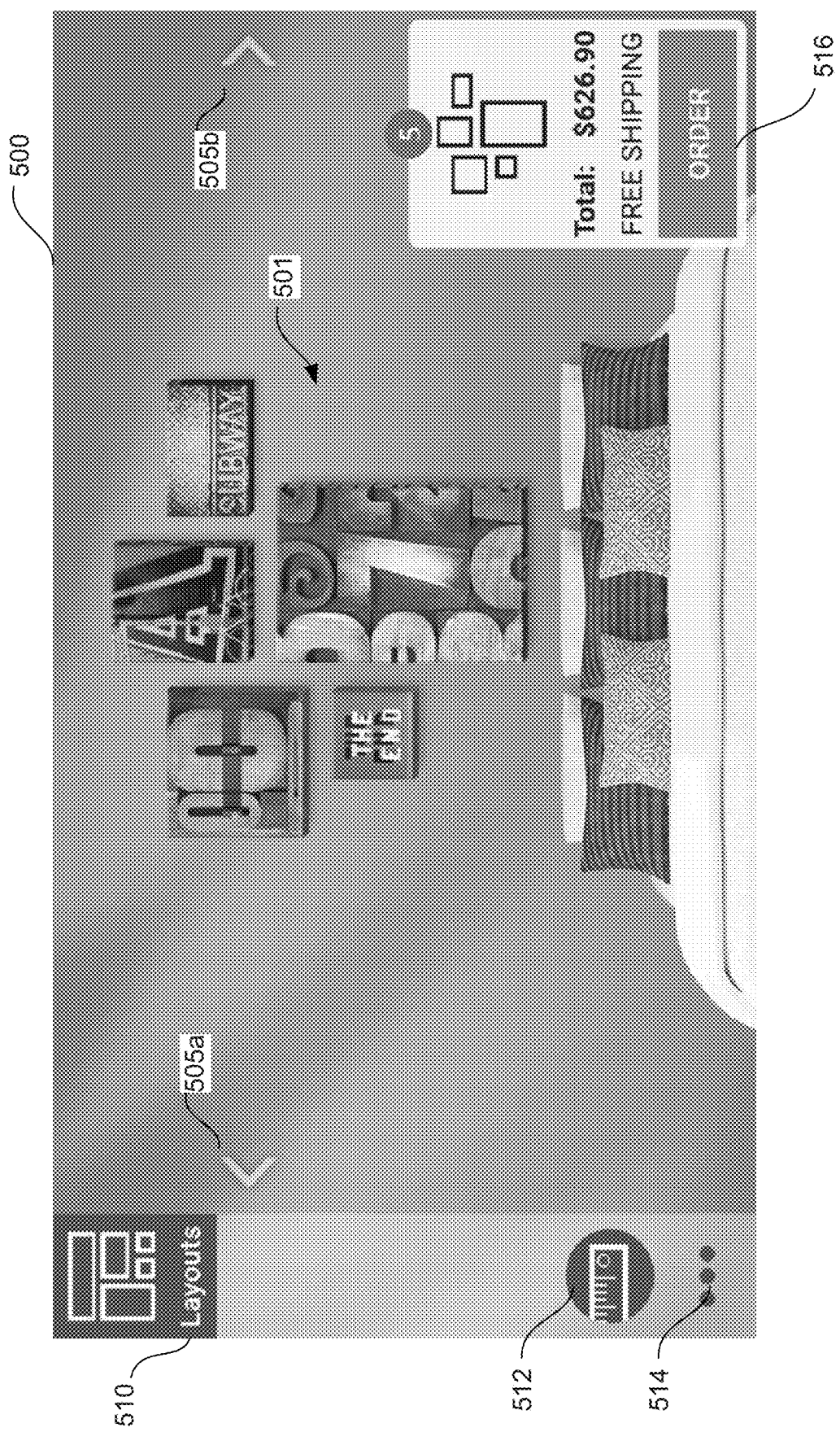
Figure 5D:
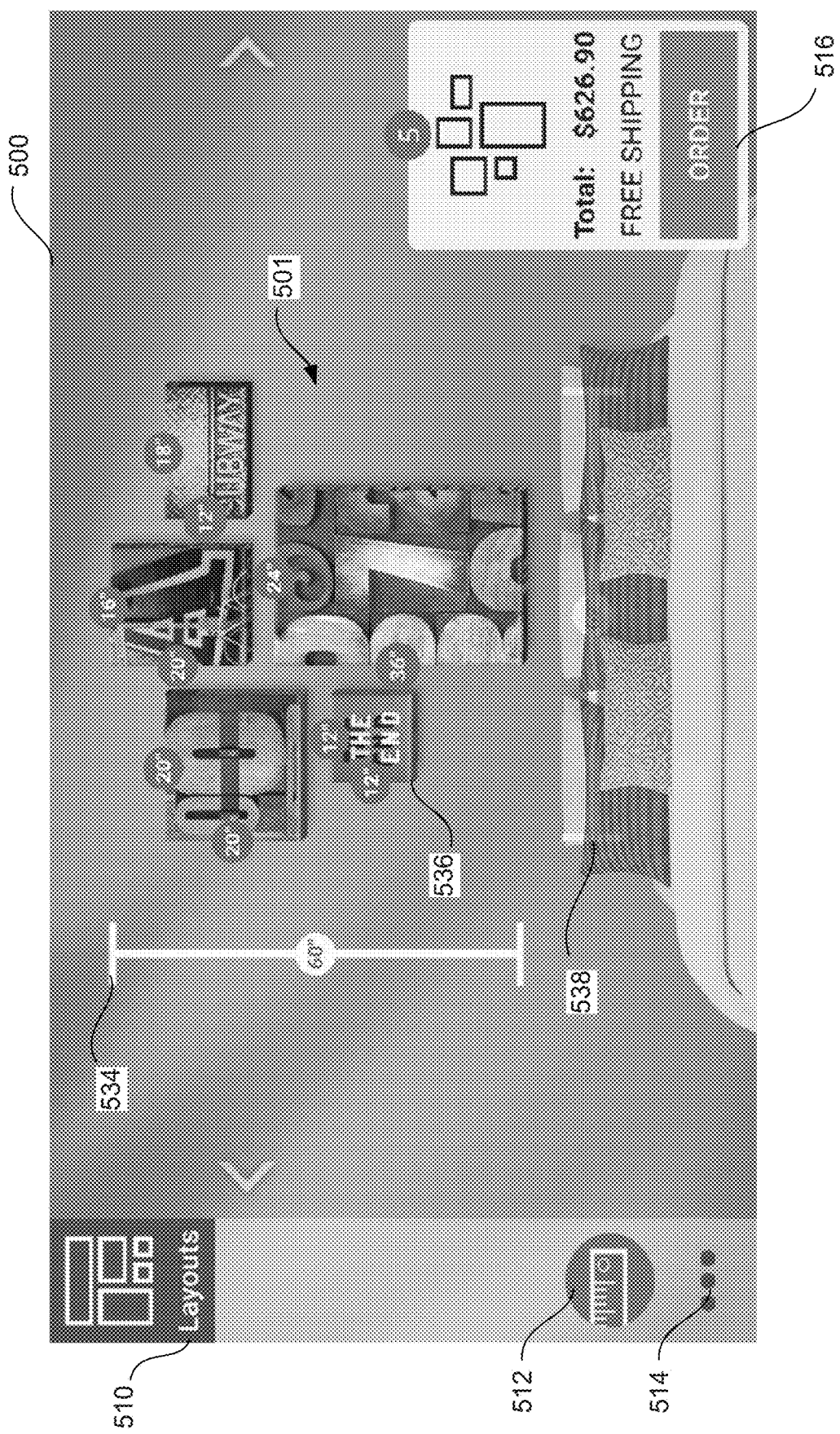
Figure 5E:
Figure 5F:
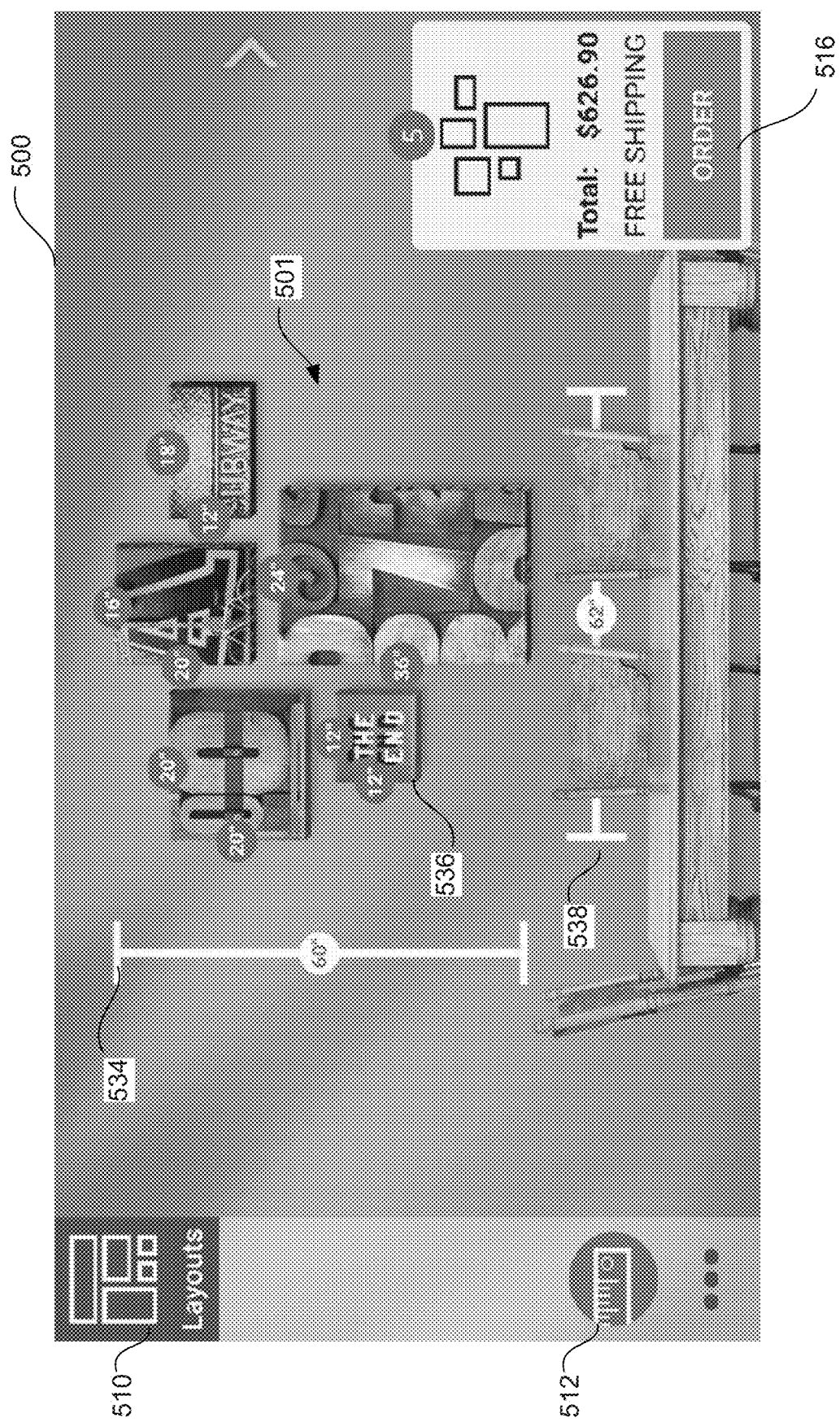

In one embodiment, in FIG. 5c, the display of the GUI 500 reveals that a curated layout containing a 5-item collage has been selected; the selected curated layout 501 is displayed centered over and in proportion to the scale of the measured width of the furniture. In one embodiment, swiping icons 505a/505b prompt the user to select different sample room furniture (unless the user has generated a customized wall art environment using the camera interface described with reference to FIG. 4a-6h). In FIG. 5d, the ruler graphic 534/538 has been activated using the ruler menu item 512 by the user so that the actual dimensions of the items 536 in inches as well as one or more of the overall actual dimensions (e.g. the height) 534 of the curated layout 501 can be compared to the actual size (e.g. width) 538 of the furniture item in the foreground, in this case a bed. This allows a user to determine whether the actual dimensions of the curated layout relative to the actual dimensions of the furniture is acceptable, or whether a different curated layout might be preferable, such as the alternative curated layout shown in FIG. 5e (and in which the room selection is now a desk) i.e. curated layout 501, a collage of 6 items, or what a different combination of room type and curated layout might look like as shown in FIG. 5f, where the room selection is now a dining table and the curated layout 501 is still the collage of 5 items.

Figure 6A:
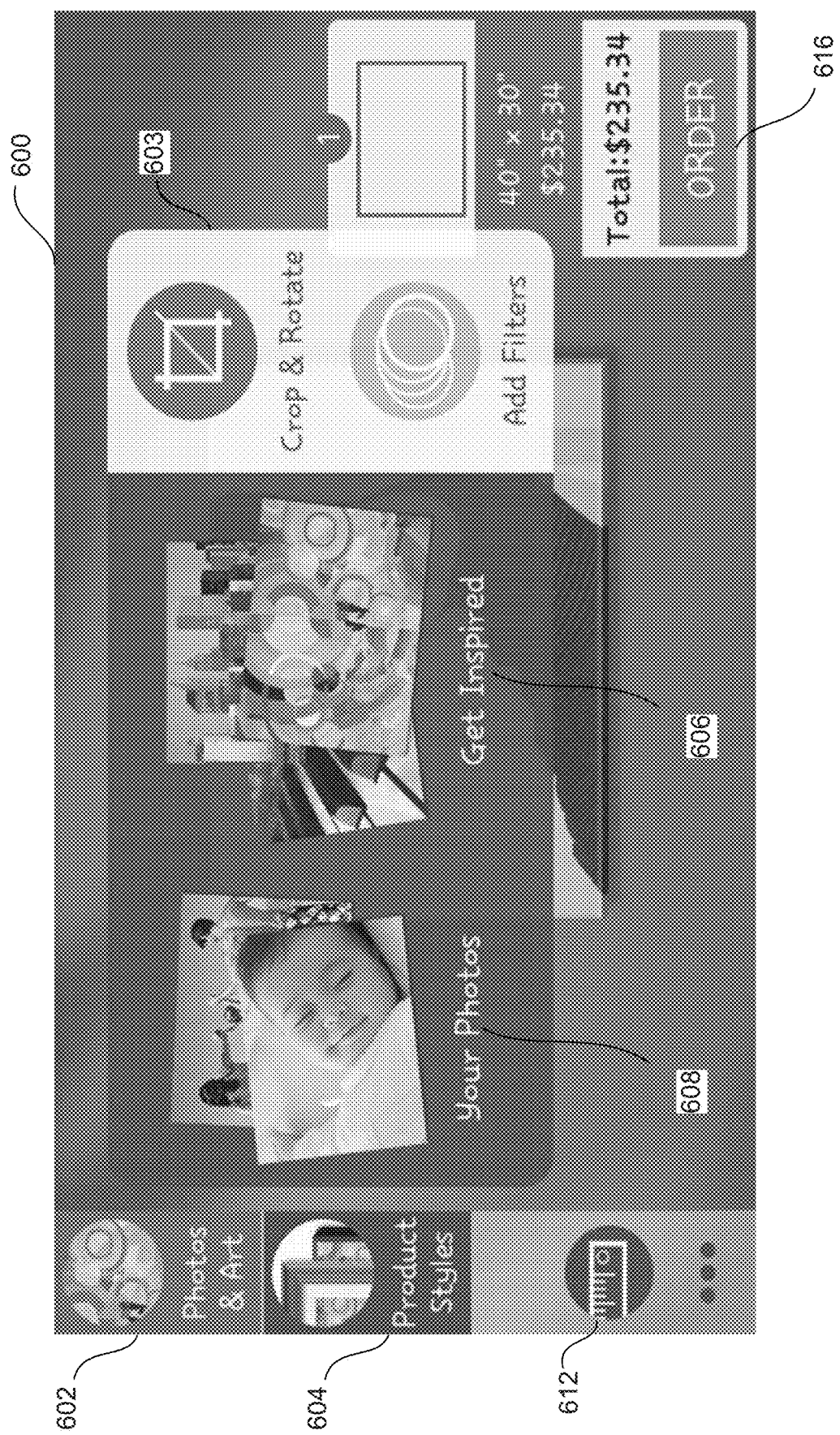

In one embodiment, FIGS. 6a-6h illustrate the several views of the GUI 600 for selecting and customizing the items in the curated layout (e.g. 501, FIGS. 5a-f) with photos or art. Upon selecting one of the items in the curated layout (e.g. 501, FIGS. 5a-f), the user is presented with the photo/art menu selection 602 and product/style menu selection 604. Upon activating the photo/art menu selection 602, the user is further prompted with the photo/art GUI 603 as shown in FIG. 6a. For example, in one embodiment, the user is prompted with the option to select from the user's own photos "Your Photos," 608 or to "Get Inspired" 606 with a selection of other art typically provided by the operator of the wall art system from the curated wall art database. As illustrated, in one embodiment the GUI 603 also includes menu selections to other photo/art options, such as cropping and rotating or adding filters to the current selection of photo or art.

Figure 6B:
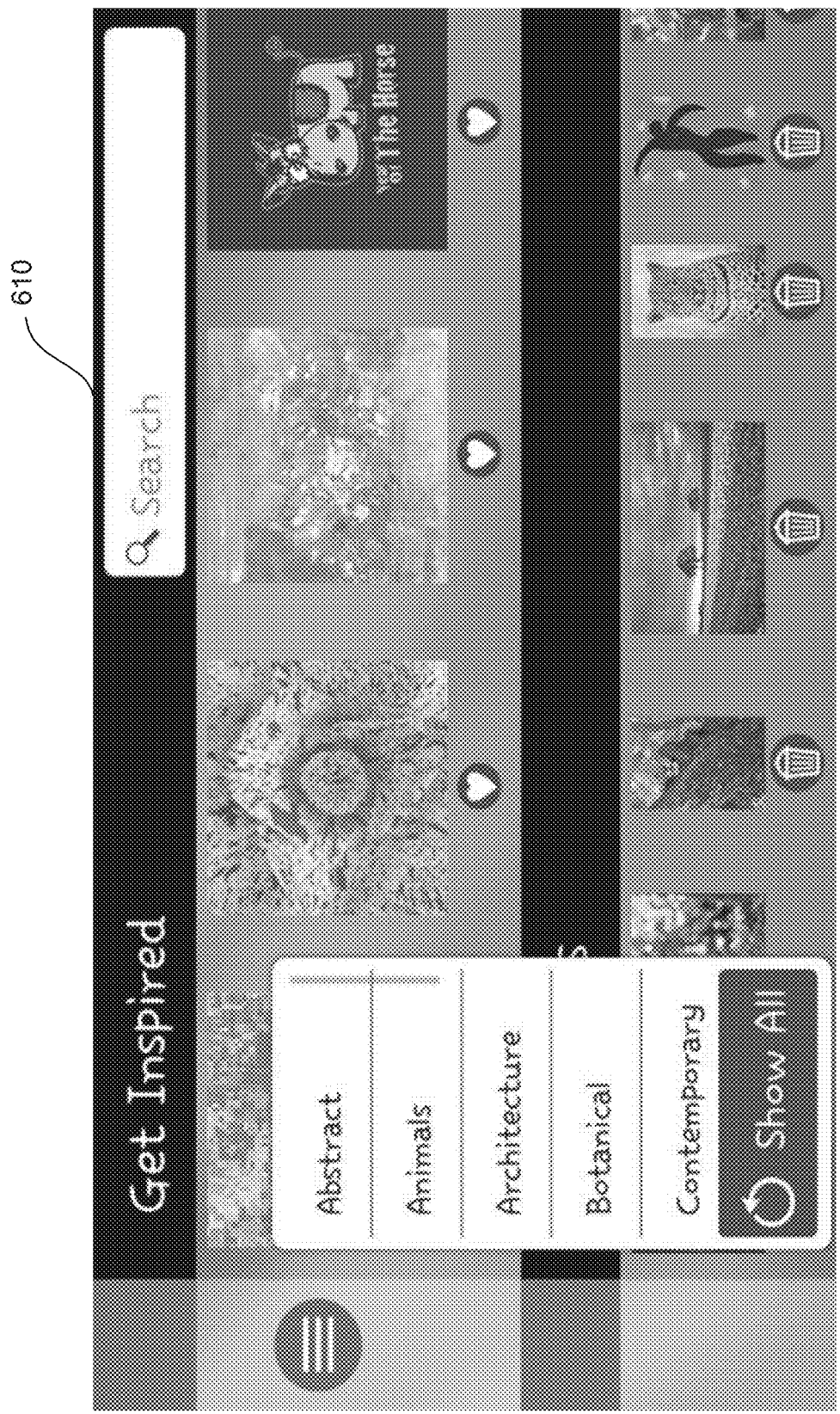

In one embodiment, in FIG. 6b, the user has selected "Get Inspired" and is prompted in GUI 610 to select an image by browsing images or selecting images by keyword or by category. In one embodiment, the user is provided with an option to tag favorite images. A "favorites" banner of swipe-able images is shown in the bottom portion of the GUI 610 to help with image selection, where the images include any of the images previously tagged as a favorite (in either the wall art system or other photo/image application operating on the user device).

Figure 6C:

In one in embodiment, in FIG. 6c, once the user has input a selection of an image the, the user is prompted in GUI 620 providing additional information about the selected image, as well as displaying additional selectable images that may be of interest to the user under a "more like this" banner.

Figure 6D:
Figure 6E:
Figure 6F:
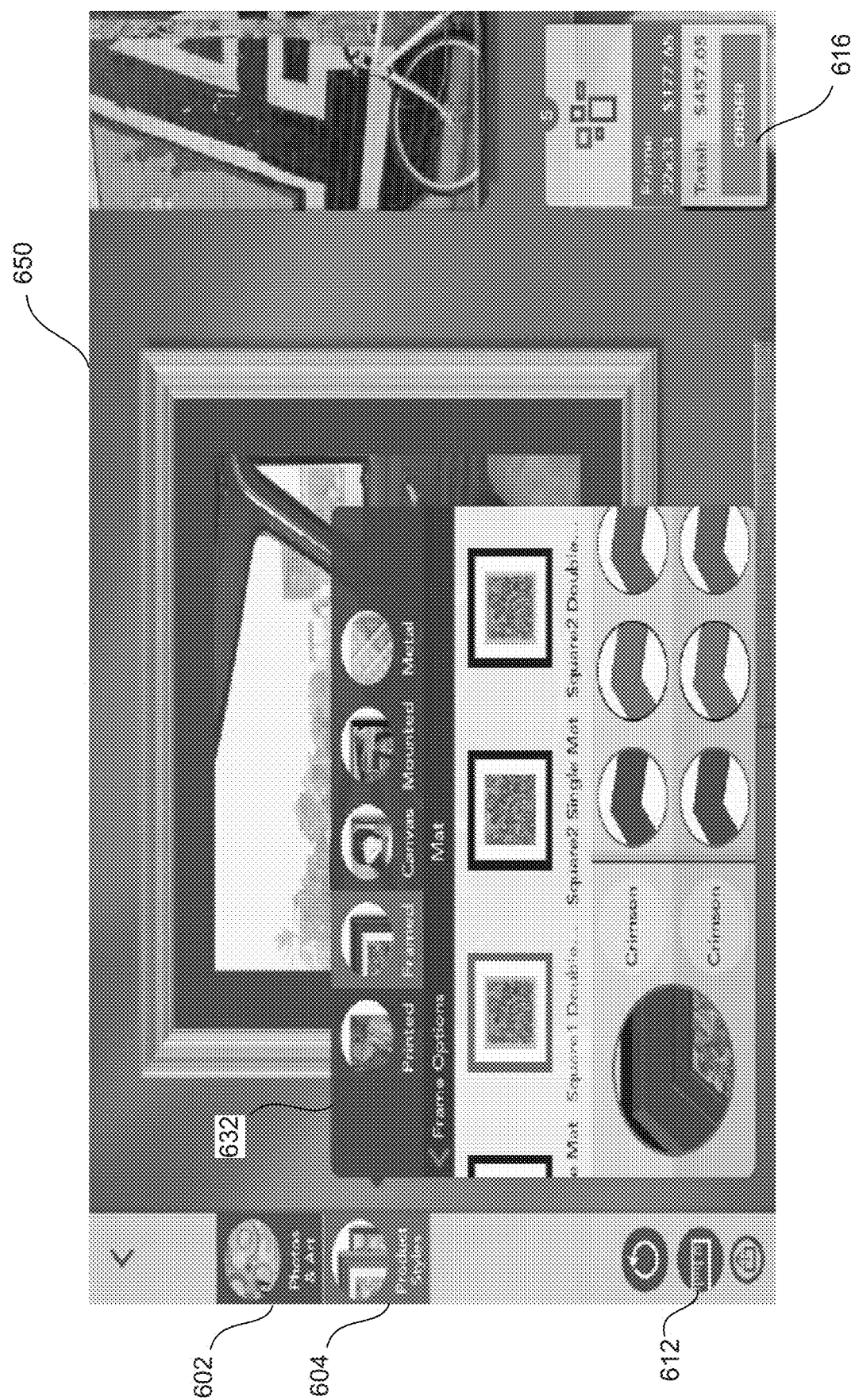
Figure 6G:
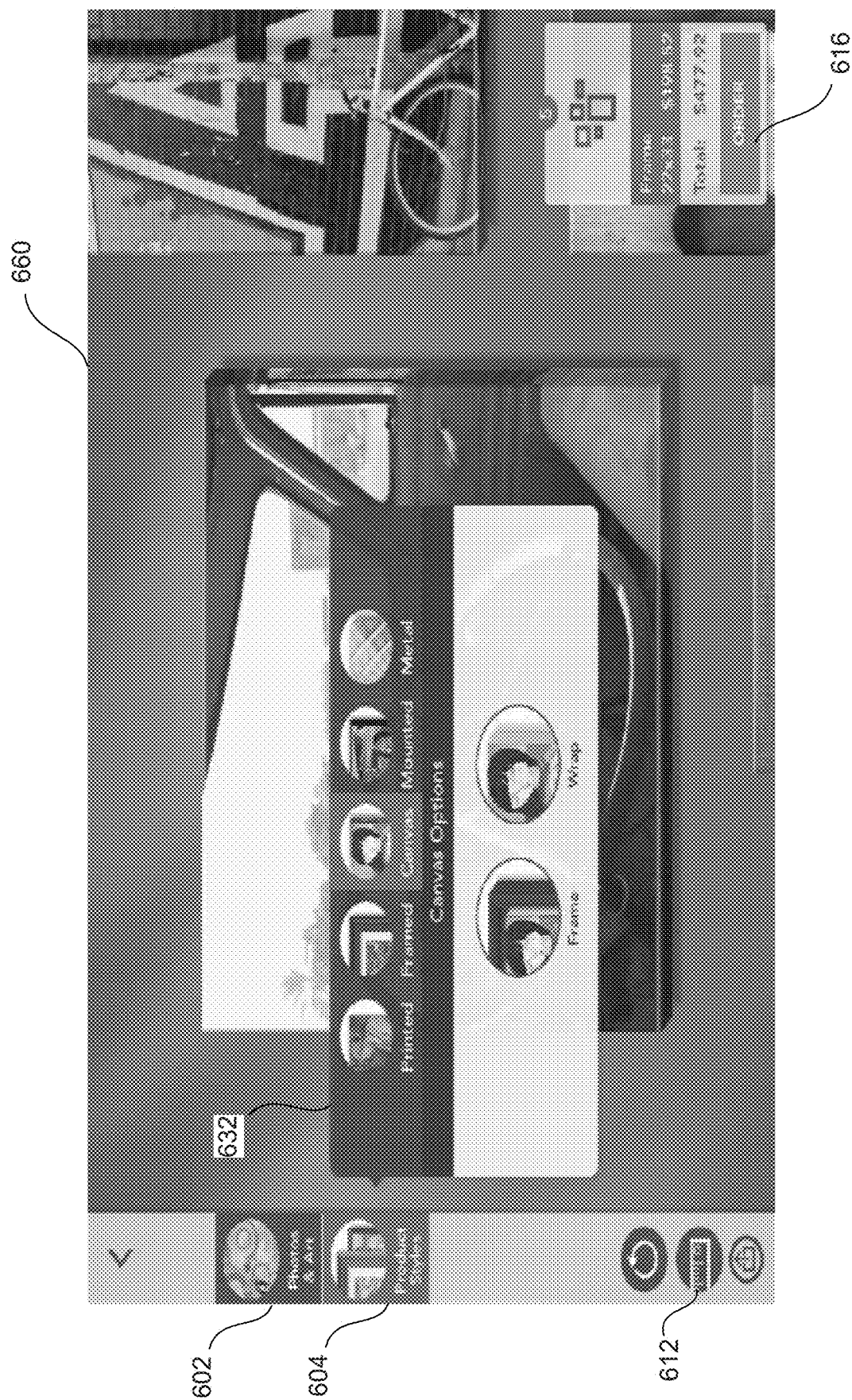
Figure 6H:

In one embodiment, once selected the image is redisplayed within the bounds of the selected item of the curated layout (e.g. 501 in FIGS. 5a-5f), the user is able to select the product/styles menu item 604 and further prompted with the "Product Styles" selection GUI 632 as shown in FIG. 6d. In GUI 632, the user is prompted to drill down through the various options for producing the selected item, including the printing options, framing, canvas, mounted, and metal options. The product options, once selected, reveal further sub-options, such as the mat options for framing, shown in GUI 640 of FIG. 6e. In a similar fashion, once the sub-option is selected, additional specifications for the sub-option is revealed, such as the options for color as shown in GUI 650 of FIG. 6f In a similar manner, GUI 660 of FIG. 6g illustrates the canvas options and the GUI 670 in FIG. 6h illustrates the mounted options. After each selection is made the display on the wall of the selected item being customized is updated to reflect the current customization.

In one embodiment, as the user drills down through the GUIs in FIGS. 6d-6h to customize the selected item of the curated layout, the corresponding iconic image of the curated layout is incorporated into the shopping interface 616 located in the lower right hand corner of each of the interfaces illustrated in FIGS. 6d-6h. The shopping interface 616 highlights the current selection and tracks the total cost of the current selection, and further provides an "ORDER" button to initiate the full shopping interface (see FIGS. 10a-10b).

Figure 7A:
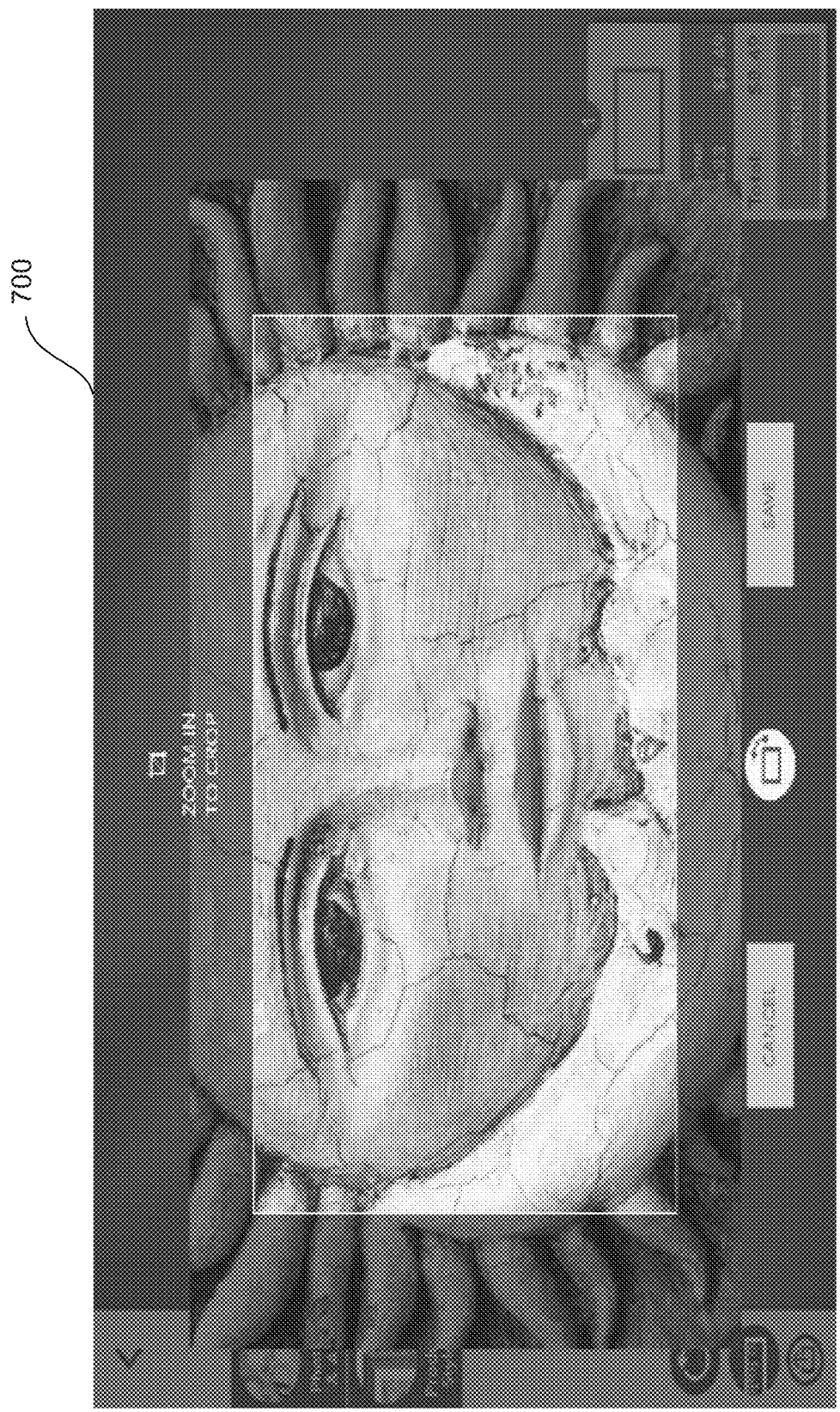
Figure 7B:
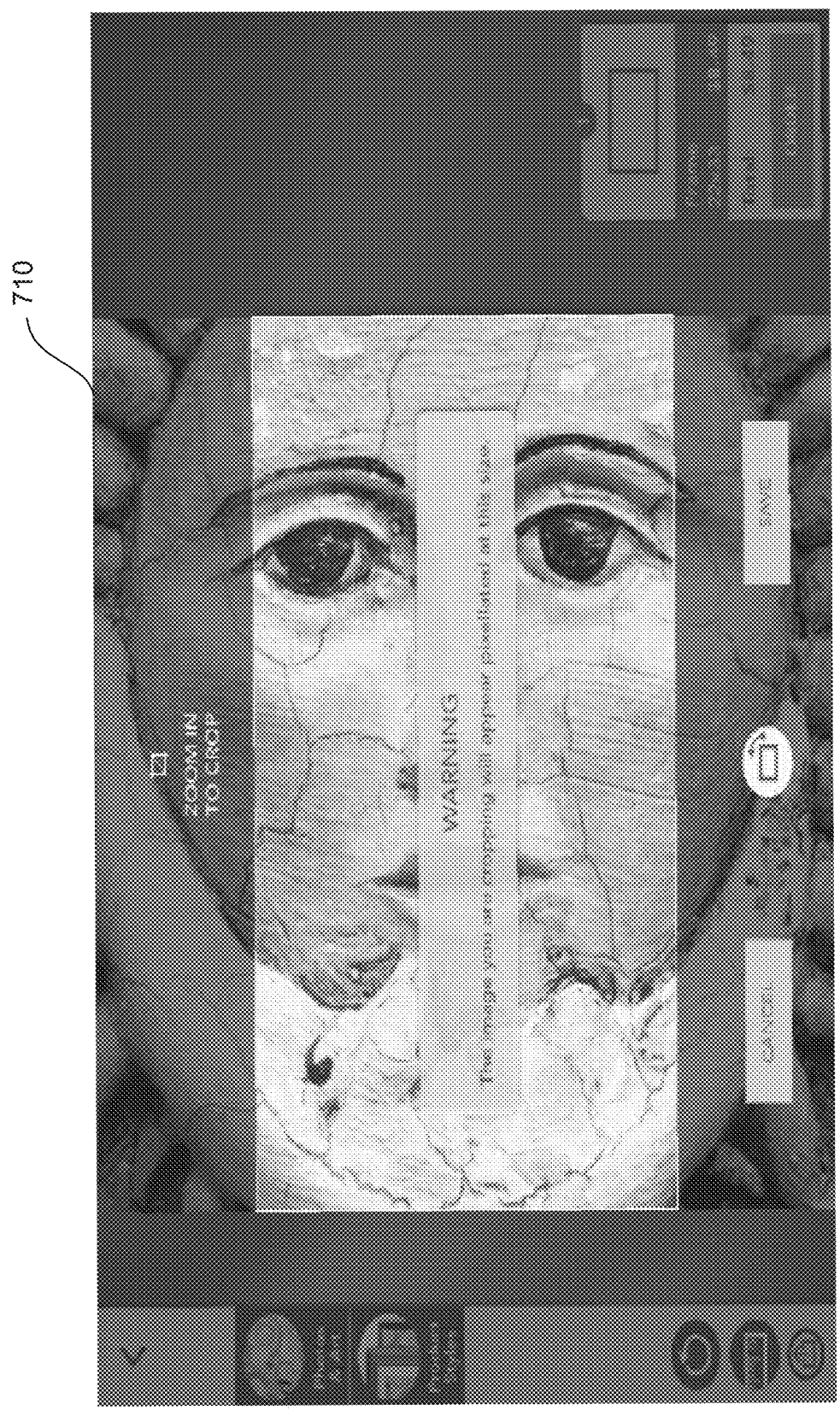

In one embodiment, in FIGS. 7a-7b, after activating the "crop & rotate" option illustrated in GUI 603 in FIG. 6a, the user is presented with an option to crop (GUI 700, FIG. 7a) and rotate (GUI 710, FIG. 7b) the selected photo or art image before redisplaying the image within the bounds of the selected item of the curated layout (e.g. 501, FIGS. 5a-5f) on the background wall of the wall art environment. In FIG. 7b, in GUI 710 the user is presented with a warning pop-up if the selected cropping results in an image whose resolution is too low for the size of the item. A similar navigational path can be provided for other photo/art options of GUI 603 (FIG. 6a) such as the "Add Filters" option (not shown).

Figure 8A:
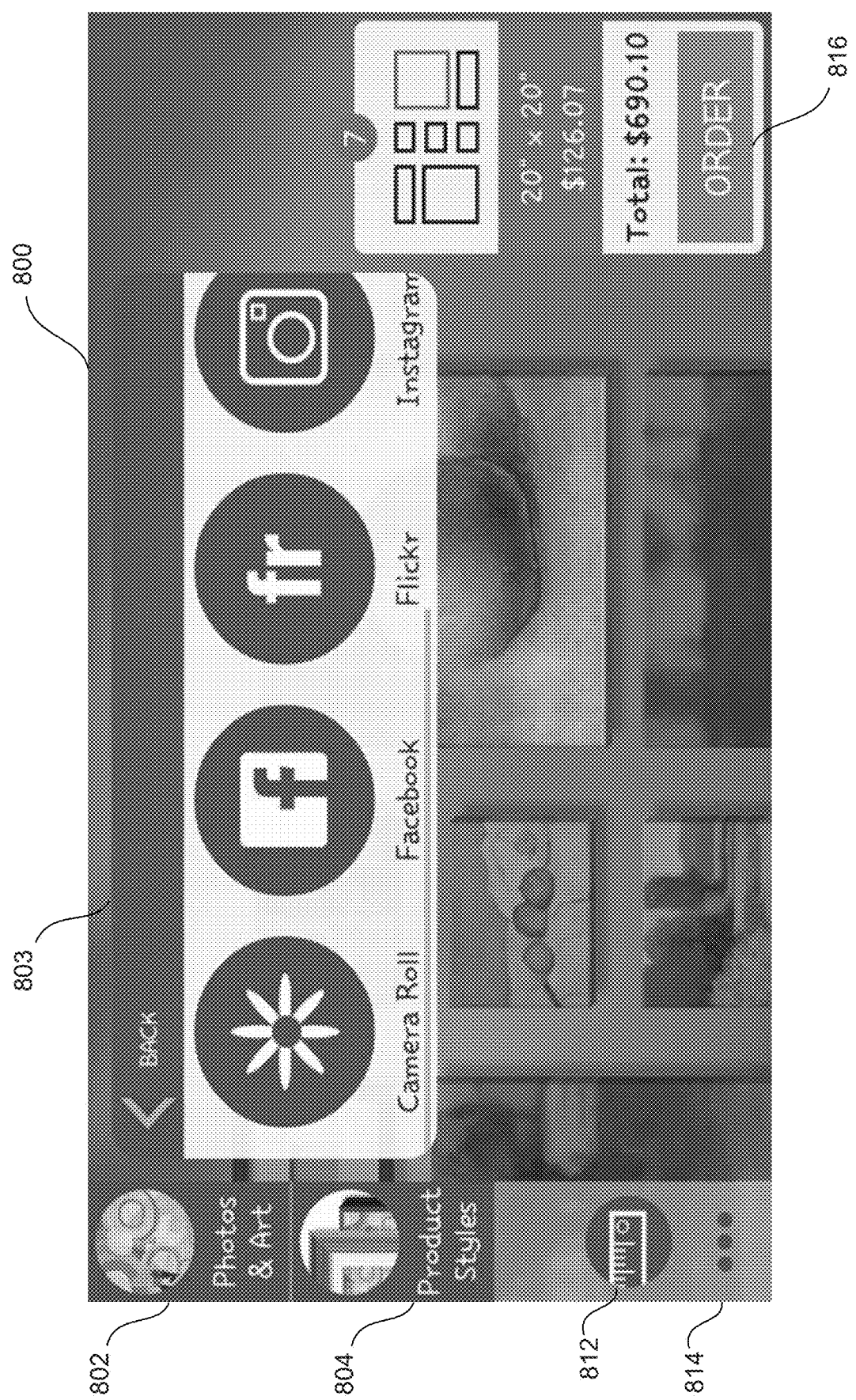
Figure 8B:
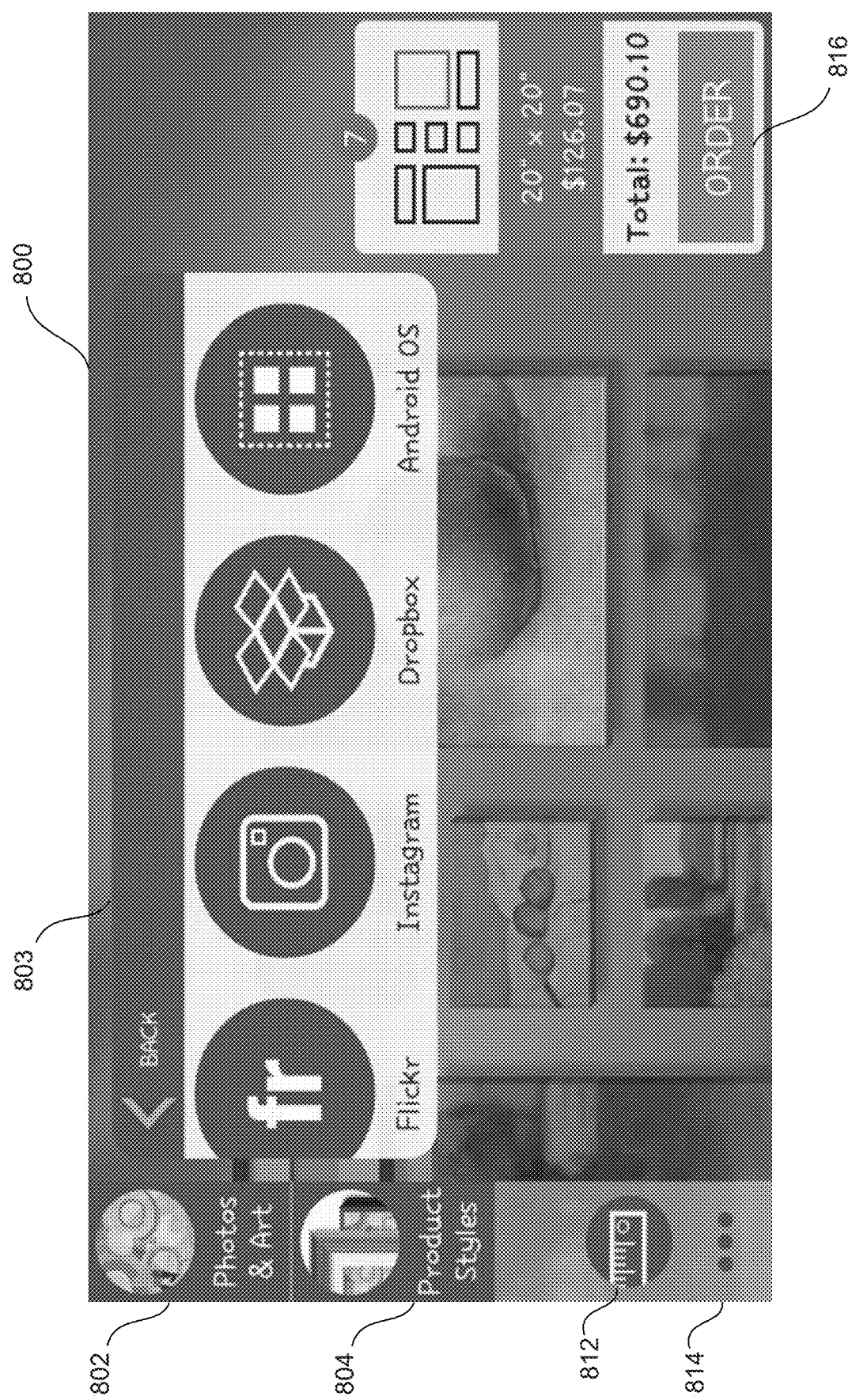

In one embodiment, in FIGS. 8a-8b, once the user has selected "Your Photos" option (option 608 of GUI 603 illustrated in FIG. 6a) the user is further prompted in GUI 800 with an GUI 803 presenting further options to select photos from their own user device "camera roll" or from a social media site or cloud-based file service.

Figure 9:
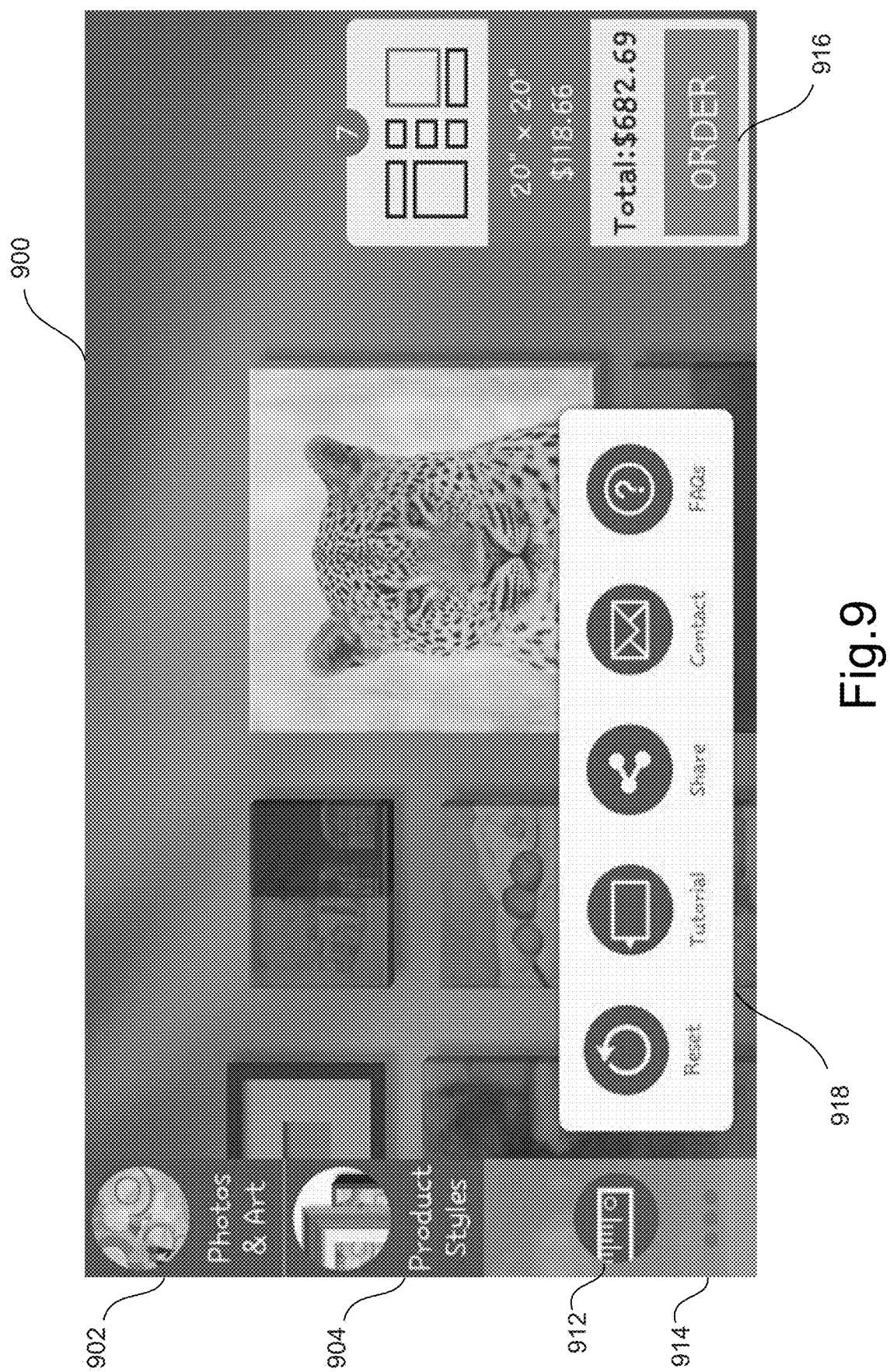

In one embodiment, in FIG. 9, the user is presented with a general menu option 914, that when activated, will display GUI 918 to prompt the user to select other features of the wall art system, including an option for sharing the curated wall that the user has created with others using social media, email, messaging and the like. In one embodiment, in addition the general menu option 914 can activate the GUI 918 to include other options to, for example, reset the wall art environment, customer help, a tutorial and an FAQ.

Figure 10A:
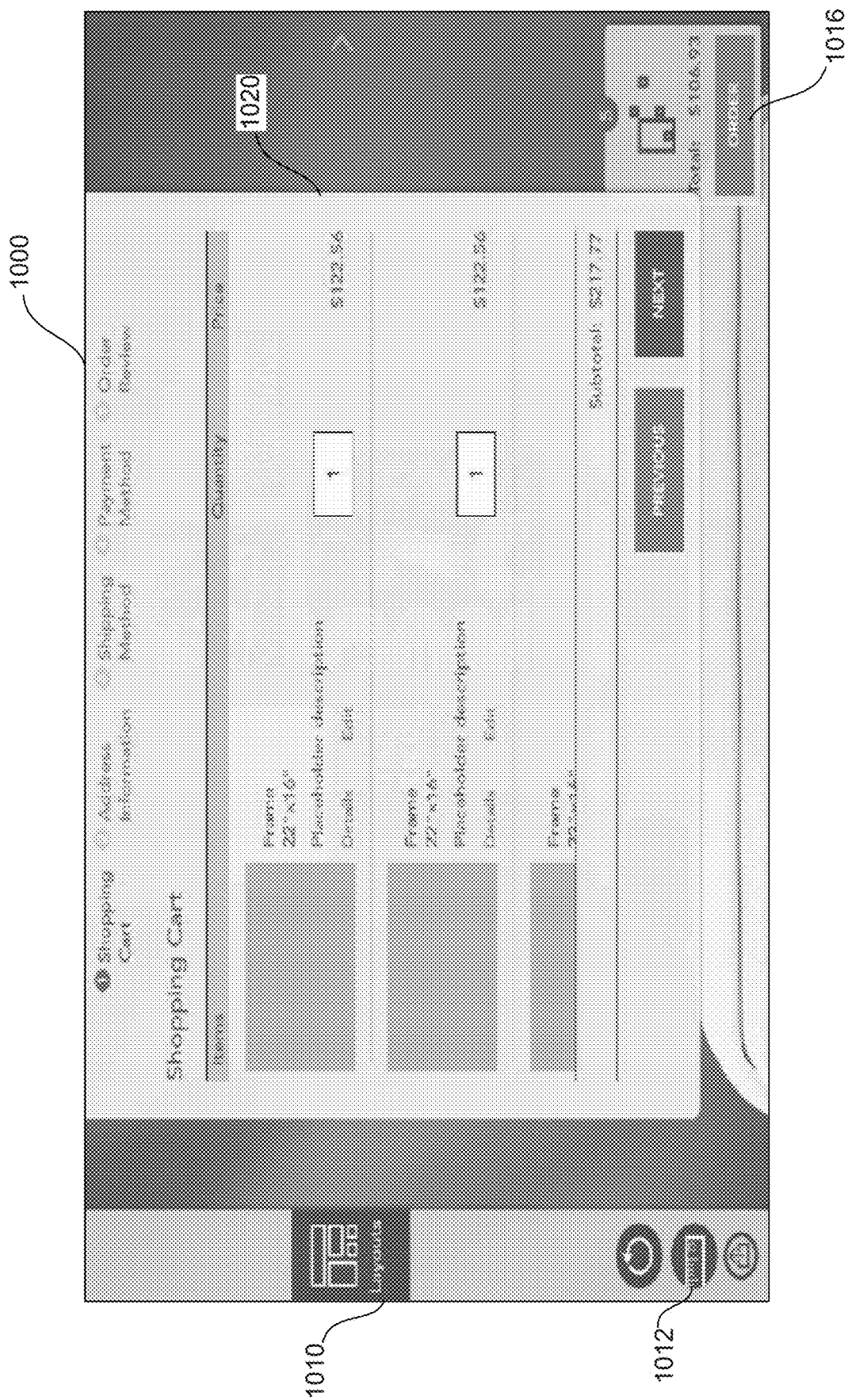
Figure 10B:
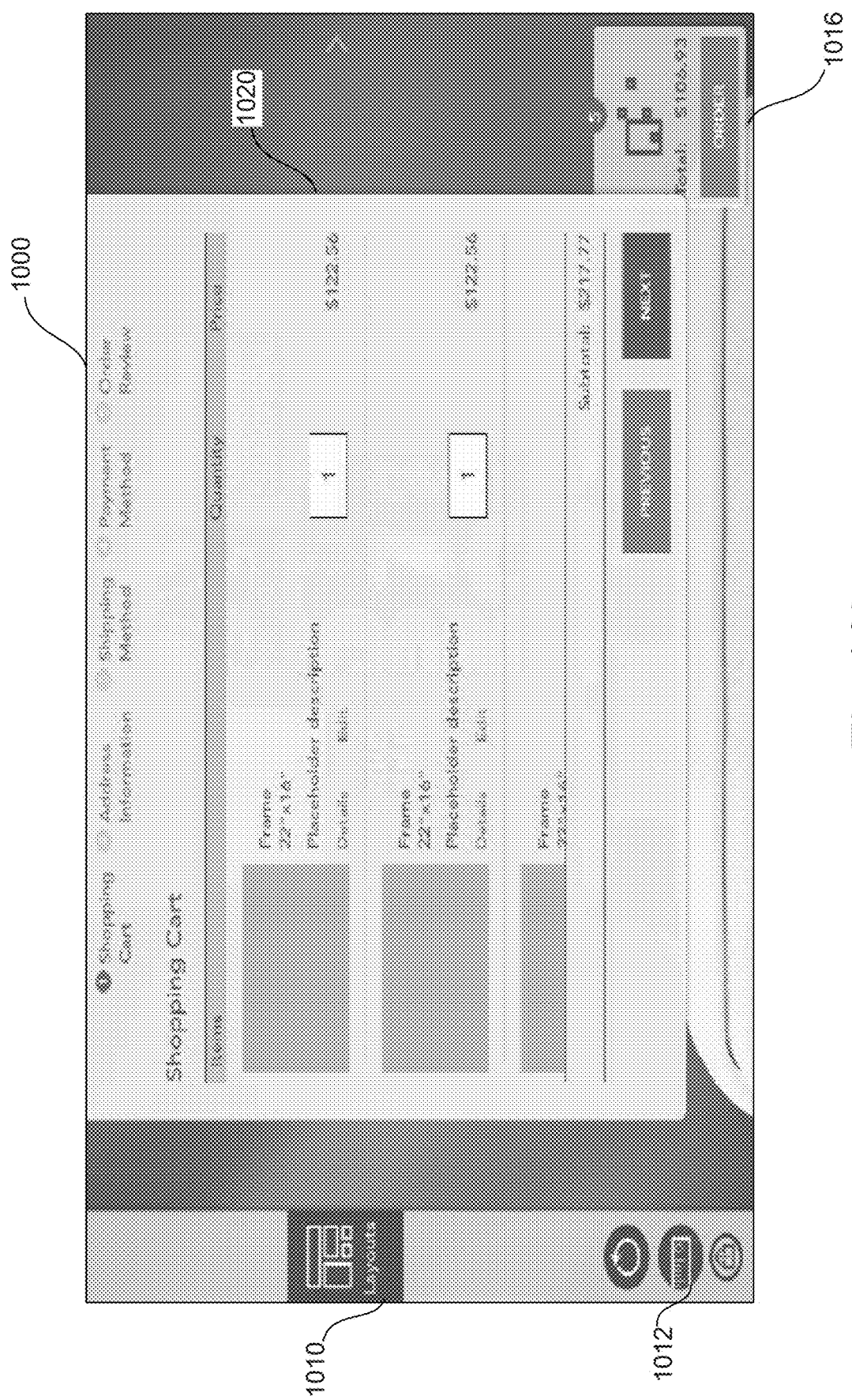

In one embodiment, in FIGS. 10a-10b, in GUI 1000 the user is presented with a full detailed shopping interface 1020 after selecting the "Order" button displayed in the summary shopping interface 1016 on the lower right corner of the product customization interfaces. In detailed shopping interface 1020 the user is guided through each purchase step and given an opportunity to make additional changes before placing the order.

Figure 11:
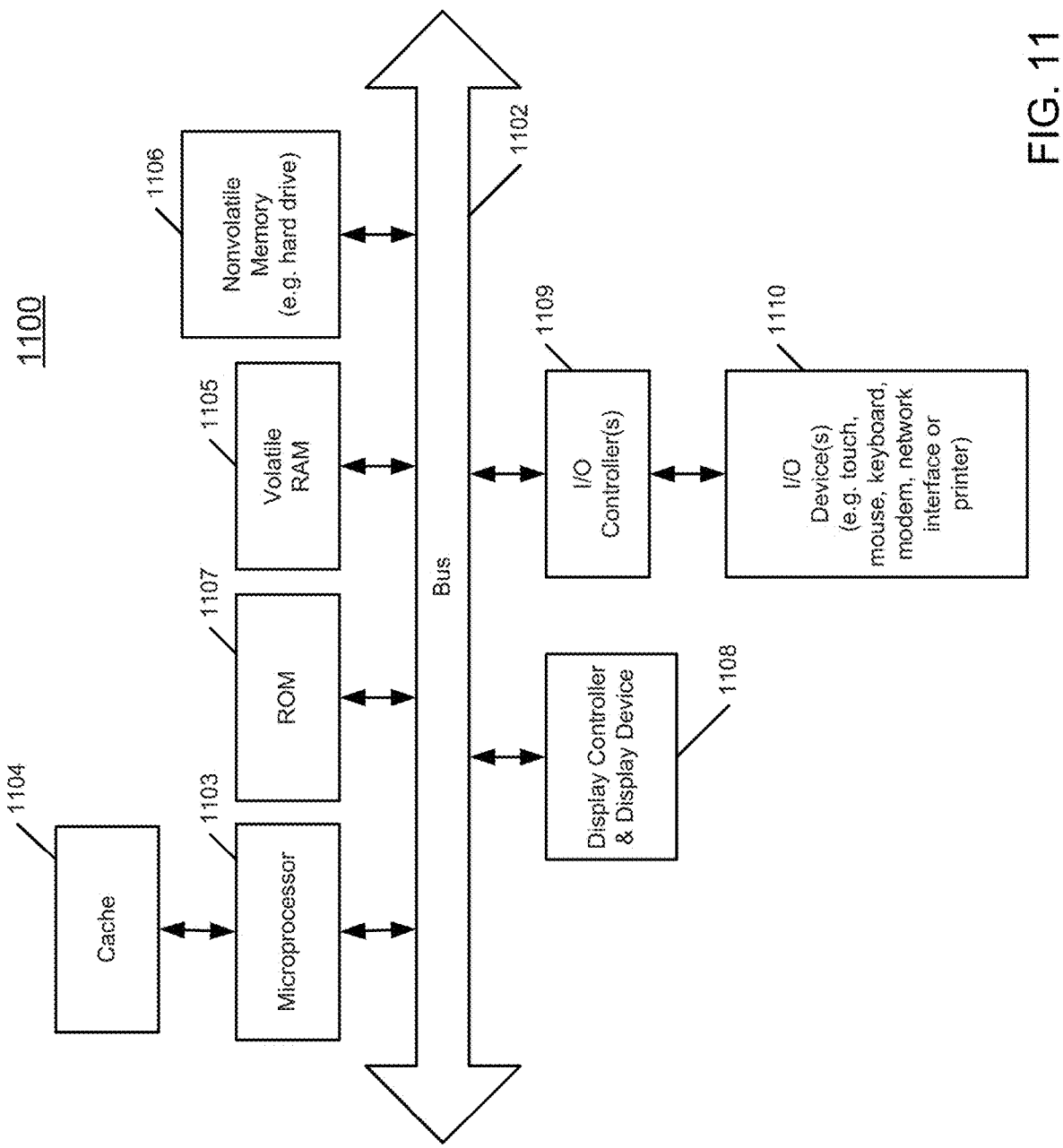
FIG. 11 is a block diagram overview of a computer system or device, which may be used with an embodiment of the invention.

FIG. 11 is a block diagram overview of a computer system 1100, or device, which may be used with one embodiment of the invention. For example, the system 1100 may be used as a client or a server as shown in FIG. 1. Note that while FIG. 11 illustrates various components of a computer system or device, it is not intended to represent any particular architecture or manner of interconnecting the components; as such details are not germane to the present invention. It will also be appreciated that network computers, various types of user devices, including hand-held computers, mobile devices, cell phones, tablets and other data processing systems, any of which may have fewer components or perhaps more components than illustrated in FIG. 11, may also be used with embodiments of the present invention.

As shown in FIG. 11, the computer system 1100, which is a type of a data processing system, includes a bus or interconnect 1102, which is coupled to one or more microprocessors 1103 and a ROM 1107, a volatile RAM 1105, and a non-volatile memory 1106. The microprocessor 1103 is coupled to cache memory 1104. The bus 1102 interconnects these various components together and also interconnects these components 1103, 1107, 1105, and 1106 to a display controller and display device 1108, as well as to input/output (I/O) devices 1110, which may be mice, keyboards, modems, network interfaces, printers, and other devices, which are well known in the art.

Typically, the input/output devices 1110 are coupled to the system through input/output controllers 1109. The volatile RAM 1105 is typically implemented as dynamic RAM (DRAM) that requires power continuously in order to refresh or maintain the data in the memory. The non-volatile memory 1106 is typically a magnetic hard drive, a magnetic optical drive, an optical drive, or a DVD RAM or other type of memory system that maintains data even after power is removed from the system. Typically, the non-volatile memory will also be a random access memory, although this is not required.

While FIG. 11 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1102 may include one or more buses connected to each other through various bridges, controllers, and/or adapters, as is well known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices.

Embodiments of the invention also relate to an apparatus for performing the operations herein, such as a computer program that is stored in a non-transitory computer or machine-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to provide a graphical user interface for shopping for wall art, the method comprising:
   in a user device having a camera, an interactive display, and a processor coupled to the camera and the interactive display:
      displaying, using the processor, a measurement interface on the interactive display of the user device, wherein the measurement interface comprises a measurement guideline having a first size superimposed on a first portion of the interactive display and an input portion superimposed on a second portion of the interactive display, the measurement guideline having a first end and a second end;
      receiving a user-entered measurement of an actual size of furniture of a furnished room through the input portion, the furniture having a first edge and a second edge;
      adjusting the first size of the measurement guideline to a second size response to the receiving the user-entered measurement of the actual size of the furniture of the furnished room through the input portion;
      prompting, using the processor, a user to take a photo of the furnished room having the furniture positioned within the second size of the measurement guideline so that the first edge is aligned to the first end and the second edge is aligned to the second end by the camera, the camera operable to capture an image of a wall and the furniture in the furnished room;
      displaying, using the processor, a wall art environment on the interactive display, the wall art environment comprising:
         a background, the wall captured in the image displayed in the background, and
         a foreground, the furniture captured in the image displayed in the foreground;
      determining, using the processor, a scale of the displayed wall art environment based on a ratio of the actual size of the furniture, entered by the user, to an image size of the furniture as captured in the image;
      displaying, using the processor, a curated layout of one or more items of wall art in proportion to the determined scale of the displayed wall art environment to simulate actual dimensions of the one or more items of wall art relative to the user-entered measurement of the actual size of the furniture when viewed using the user device, the curated layout positioned on the interactive display to appear as if hung on the wall above the furniture captured in the image; and
      prompting, using the processor, the user to purchase physical instantiations of any of the one or more of items of wall art displayed in the curated layout.

2. The computer-implemented method as in claim 1, wherein the scale is further based upon one or more camera parameters that comprise at least one of focus distance, focus mode, camera angle, or image size, wherein the measurement guideline is superimposed on the interactive display during camera operation;
   and wherein the measurement guideline superimposed on the interactive display is adjusted based on the determined scale of the wall art environment.

3. The computer-implemented method as in claim 2, wherein the entered measurement of the actual size of the furniture is a width of the furniture, the width measured in a horizontal plane from the first edge to the second edge of the furniture in the furnished room, wherein the user device is operable to compute the ratio based on the measured width of the furniture and camera parameters generated during camera operation.

4. The computer-implemented method as in claim 1, further comprising: in the user device having the interactive display:
   receiving an input associated with a selection of the curated layout from among a plurality of curated layouts, each curated layout in the plurality of curated layouts containing a collage of one or more prearranged items; and
   displaying the selected curated layout including each of the one or more prearranged items of the collage in proportion to the determined scale of the displayed wall art environment.

5. The computer-implemented method as in claim 4, wherein an overall dimension of the curated layout includes a height and width of the collage of the one or more prearranged items, and a dimension of each item includes a height and width of the item.

6. The computer-implemented method as in claim 1, further comprising:
   in the user device having the interactive display:

receiving an input associated with a selection of any one of the one or more item of wall art of the curated layout;

displaying a customization interface to customize the selected item of wall art, the customization interface including an image selector operable to select an image and a style selector operable to select a style, the image selector and style selector operable to communicate with a wall art server having a catalog of images and product styles from which to select;

customizing the selected item of wall art with a selected image and a selected style responsive to receiving input associated with the image selector and the style selector; and updating the display of the curated layout of the one or more item of wall art with the customized item of wall art.

7. The computer-implemented method as in claim 6, further comprising: in the user device having the interactive display:

saving the updated display of the curated layout as a curated wall, the curated wall containing data for regenerating the updated display of the curated layout and the displayed wall art environment.

8. The computer-implemented method as in claim 7, further comprising:

in the user device having the interactive display;

displaying a sharing interface operable to prompt the user to share the curated wall with a different user using any one of one or more social media platforms installed on the user device, including activating the sharing interface to cause the curated wall to be shared with the different user, including sharing a link to a shopping interface for purchasing physical instantiations of any one or more of the one or nm e items of wall art as customized in the curated wall.

9. The computer-implemented method as in claim 6, further comprising:

in the user device having the interactive display:

selecting the customized item of wall art in the curated layout;

displaying a cost of purchasing a physical instantiation of the currently selected item in the curated layout, the currently selected item customized with the selected image and selected style;

receiving an input activating a merchant interface operable to purchase the physical instantiation of the currently selected item in the curated layout; and transacting a purchase using the merchant interface, the purchase for the physical instantiation of the currently selected item in the curated layout, the physical instantiation customized with the selected image and selected style.

10. The computer-implemented method as in claim 1, wherein prompting the user to purchase the wall art includes, in the user device having the interactive display:

displaying a shopping interface alongside the wall art environment and curated layout, including displaying a cost of purchasing a physical instantiation of the one or more items of wall art displayed in the curated layout.

11. The computer-implemented method as in claim 1, further comprising:

in the user device having the interactive display;

displaying a wall art environment interface operable to change the wall art environment, including any one or both of:

displaying a furniture selector to change the furniture responsive to receiving an input associated with the foreground of the wall art environment; and displaying a wall color selector to change a color of the wall responsive to receiving an input associated with the background of the wall art environment.

12. The computer-implemented method as in claim 11, wherein the change in the wall art environment is based on a predefined image of a sample room depicting a wall having a predefined color and furniture having a predefined width, the sample room selected from any one or more sample rooms, including a dining room, living room, bedroom, kitchen, office and conference room.

13. The computer-implemented method as in claim 12, further comprising:

in the user device having the interactive display:

displaying a ruler interface to superimpose dimensions on the interactive display when displaying the wall art environment, the dimensions including any one or more of:

a width of any one or more of the one or more items of wall art in the curated layout;

a height of any one or more of the one or more items of wall art in the curated layout;

an overall width of the curated layout of the one or more items of wall art;

an overall height of the curated layout of the one or more items of wall art; and a width of the furniture, including a respective one of a measured width of the furniture and the predefined width of the furniture currently displayed in the wall art environment.

14. A computer-implemented wall art system for facilitating a selection of wall decor, the system comprising:

a user device having a camera and an interactive display;

a processor on the user device, the processor configured to:

display a measurement interface on the interactive display of the user device, wherein the measurement interface comprises a measurement guideline having a first size superimposed on a first portion of the interactive display and an input portion superimposed on a second portion of the interactive display, the measurement guideline having a first end and a second end;

receive a user-entered measurement of an actual size of furniture of a furnished room through the input portion, the furniture having a first edge and a second edge;

adjust the first size of the measurement guideline to a second size in response to the receiving the user-entered measurement of the actual size of furniture of the furnished room through the input portion;

activate the camera to prompt a user to take a photo of the furnished room having the furniture positioned within the second size of the measurement guideline so that the first edge is aligned to the first end and the second edge is aligned to the second end by the camera, the camera operable to capture an image of a wall and the furniture in the furnished room;

display a wall art environment on the interactive display, the wall art environment comprising:

a background, the wall captured in the image displayed in the background, and a foreground, the furniture captured in the image displayed in the foreground;

determine a scale of the displayed wall art environment based on a ratio of the actual size of the furniture, entered by the user, to an image size of the furniture as captured in the image;

display a curated layout of one or more items of wall art in proportion to the determined scale of the displayed wall art environment to simulate actual dimensions of the one or more items of wall art relative to the user-entered measurement of the actual size of the furniture when viewed using the user device, the curated layout positioned on the interactive display to appear as if hung on the wall above the furniture captured in the image; and prompt the user to purchase physical instantiations of any of the one or more of items of wall art displayed in the curated layout.

15. The computer-implemented wall art system as in claim 14, wherein the scale is further based upon one or more camera parameters that comprise at least one of focus distance, focus mode, camera angle, or image size, wherein the measurement guideline is superimposed on the interactive display during camera operation; and wherein the measurement guideline superimposed on the interactive display is adjusted based on the determined scale of the wall art environment.

16. The computer-implemented wall art system as in claim 15, wherein the entered measurement of the actual size of the furniture is a width of the furniture, the width measured in a horizontal plane from the first edge to the second edge of the furniture in the furnished room wherein the user device is operable to compute the ratio based on the measured width of the furniture and camera parameters generated during camera operation.

17. The computer-implemented wall art system as in claim 14, the processor further configured to:

receive an input associated with a selection of the curated layout from among a plurality of curated layouts, each curated layout in the plurality of curated layouts containing a collage of one or more pre-arranged items; and display the selected curated layout including each of the one or more prearranged item of the collage, in proportion to the determined scale of the displayed wall art environment.

18. A non-transitory computer-readable medium storing instructions that, when executed on a processor of a computer system having an interactive display and a camera, cause the system to:

display a measurement interface on the interactive display of a user device, wherein the measurement interface comprises a measurement guideline having a first size superimposed on a first portion of the interactive display and an input portion superimposed on a second portion of the interactive display, the measurement guideline having a first end and a second end;

receive a user-entered measurement of an actual size of furniture of a furnished room through the input portion, the furniture having a first edge and a second edge;

adjust the first size of the measurement guideline to a second size in response to the receiving the user-entered measurement of the actual size of furniture of the furnished room through the input portion;

prompt a user to take a photo of the furnished room having the furniture positioned within the second size of the measurement guideline so that the first edge is aligned to the first end and the second edge is aligned to the second end by the camera, the camera operable to capture an image of a wall and the furniture in the furnished room;

display a wall art environment on the interactive display, the wall art environment comprising:

a background, the wall captured in the image displayed in the background, and a foreground, the furniture captured in the image displayed in the foreground;

determine a scale of the displayed wall art environment based on a ratio of the actual size of the furniture, entered by the user, to an image size of the furniture as captured in the image;

display a curated layout of one or more item of wall art in proportion to the determined scale of the displayed wall art environment to simulate actual dimensions of the one or more items of wall art relative to the user-entered measurement of the actual size of the furniture when viewed using the user device, the curated layout positioned on the interactive display to appear as if hung on the wall above the furniture captured in the image; and prompt the user to purchase physical instantiations of any of the one or more of items of wall art displayed in the curated layout.

19. The non-transitory computer-readable medium as in claim 18, wherein the scale is further based upon one or more camera parameters that comprise at least one of focus distance, focus mode, camera angle, or image size, wherein the measurement guideline is superimposed on the interactive display during camera operation;

and wherein the measurement guideline superimposed on the interactive display is adjusted based on the determined scale of the wall art environment.

20. The non-transitory computer-readable medium as in claim 19, wherein the entered measurement of the actual size of the furniture is a width of the furniture, the width measured in a horizontal plane from the first edge to the second edge of the furniture in the furnished room, wherein the user device is operable to compute the ratio based on the measured width of the furniture and camera parameters generated during camera operation.

21. The non-transitory computer-readable medium as in claim 18, the instructions further comprising instructions causing the system to:

receive an input associated with a selection of the curated layout from among a plurality of curated layouts, each curated layout in the plurality of curated layouts containing a collage of one or more pre-arranged items; and display the selected curated layout, including each of the one or more prearranged items of the collage, in proportion to the determined scale of the displayed wall art environment.

* * * * *